United States Patent
Kamada

(10) Patent No.: US 9,501,459 B2
(45) Date of Patent: Nov. 22, 2016

(54) DETECTING INFLUENCE CAUSED BY CHANGING THE SOURCE CODE OF AN APPLICATION FROM WHICH A DOCUMENT OBJECT MODEL TREE AND CASCADING STYLE SHEET MAY BE EXTRACTED

(71) Applicant: International Business Machines Corporation, Armonk, NY (US)

(72) Inventor: Keisuke Kamada, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 193 days.

(21) Appl. No.: 14/535,544

(22) Filed: Nov. 7, 2014

(65) Prior Publication Data

US 2015/0161088 A1  Jun. 11, 2015

(30) Foreign Application Priority Data

Dec. 6, 2013  (JP) ................................. 2013-252681

(51) Int. Cl.
  *G06F 17/00* (2006.01)
  *G06F 17/22* (2006.01)
  *G06F 11/36* (2006.01)

(52) U.S. Cl.
  CPC ......... *G06F 17/227* (2013.01); *G06F 11/3688* (2013.01); *G06F 17/2247* (2013.01)

(58) Field of Classification Search
  CPC .................................................. G06F 17/227
  See application file for complete search history.

(56) References Cited

U.S. PATENT DOCUMENTS

| 7,769,773 | B1* | 8/2010 | Doubek | G06F 17/30914 707/769 |
| 9,208,054 | B2* | 12/2015 | Prasad | G06F 11/3604 |
| 2012/0331375 | A1* | 12/2012 | Fanning | G06F 17/30896 715/234 |
| 2014/0317602 | A1* | 10/2014 | Zuo | G06F 11/362 717/125 |

FOREIGN PATENT DOCUMENTS

| JP | 2009140155 A | | 6/2009 |
| JP | 2012168950 A | * | 9/2012 |
| JP | 2013054693 A | | 3/2013 |

OTHER PUBLICATIONS

McDaniel et al., "The CloudBrowser Web Application Framework," SPLASH 2012, Oct. 2012, Arizona, USA, Copyright 2012 ACM, p. 141-156.*

Mesbah et al., "Automated Cross-Browser Compatibility Testing," ICSE 2011, Honolulu, HI, USA, Copyright 2011 ACM, p. 561-570.*

(Continued)

*Primary Examiner* — Amelia Tapp
(74) *Attorney, Agent, or Firm* — Nicholas D. Bowman

(57) ABSTRACT

One embodiment is a computer-implemented method for detecting an influence caused by changing a source code of an application from which a document object model (DOM) tree and cascading style sheets (CSSs) are extracted. The method includes saving one or more input operations of a user of the application, a DOM tree, and a CSS for each of one or more times that an instruction is received to check a screen state. After the source code is changed, the one or more input operations are emulated in an operation order, for each of the one or more times. A DOM tree and CSS are acquired for each of the one or more times. The saved DOM tree and CSS are compared with the acquired DOM tree and CSS for each of the one or more times. A result of the comparison is output.

20 Claims, 18 Drawing Sheets

(56) References Cited

OTHER PUBLICATIONS

"Rational Functional Tester (Functional Test/Regression Test)", [online], [retrieved on Sep. 27, 2013], Internet <URL: http://www-06.ibm.com/software/jp/rational/products/test/rft/>, 2 pgs.

"Selenium HQ", [online], [retrieved on Sep. 26, 2013], Internet <URL:http://docs.seleniumhq.org/>, 2 pgs.

HP QuickTest Professional 10.0 software, [online], [retrieved on Sep. 27, 2013], Internet <URL: http://h50146.www5.hp.com/products/software/hpsoftware/solutions/lineup/qtp/new.html>, 2 pgs.

Takashi Okamoto, "Selenium for automating Web test regardless of browser (1/3)", [online], [retrieved on Sep. 27, 2013], Internet <http://www.atmarkit.co.jp/ait/articles/0908/19/news109.html>, 5 pgs.

Takashi Okamoto, "Selenium for automating Web test regardless of browser (2/3)", [online], [retrieved on Sep. 27, 2013], Internet <http://www.atmarkit.co.jp/ait/articles/0908/19/news109_2.html>, 6 pgs.

Takashi Okamoto, "Selenium for automating Web test regardless of browser (3/3)", [online], [retrieved on Sep. 27, 2013], Internet <http://www.atmarkit.co.jp/ait/articles/0908/19/news109_3.html>, 5 pgs.

Unknown, "Smartbear TestComplete, Reducing Cost by Automation of GUI Testing", retrieved on Nov. 7, 2014, <http://www.xlsoft.com/jp/products/smartbear/testcomplete.html?tab=0>, 4 pages.

K. Hohshoh et al., "Effective System Development Practice Using Tools—Aiming at Smarter System Development", IBM Japan, Provision Spring No. 69, 2011, obtainable from Internet <http://www-06.ibm.com/ibm/jp/provision/no69/pdf/69_article3.pdf>, 10 pgs.

* cited by examiner

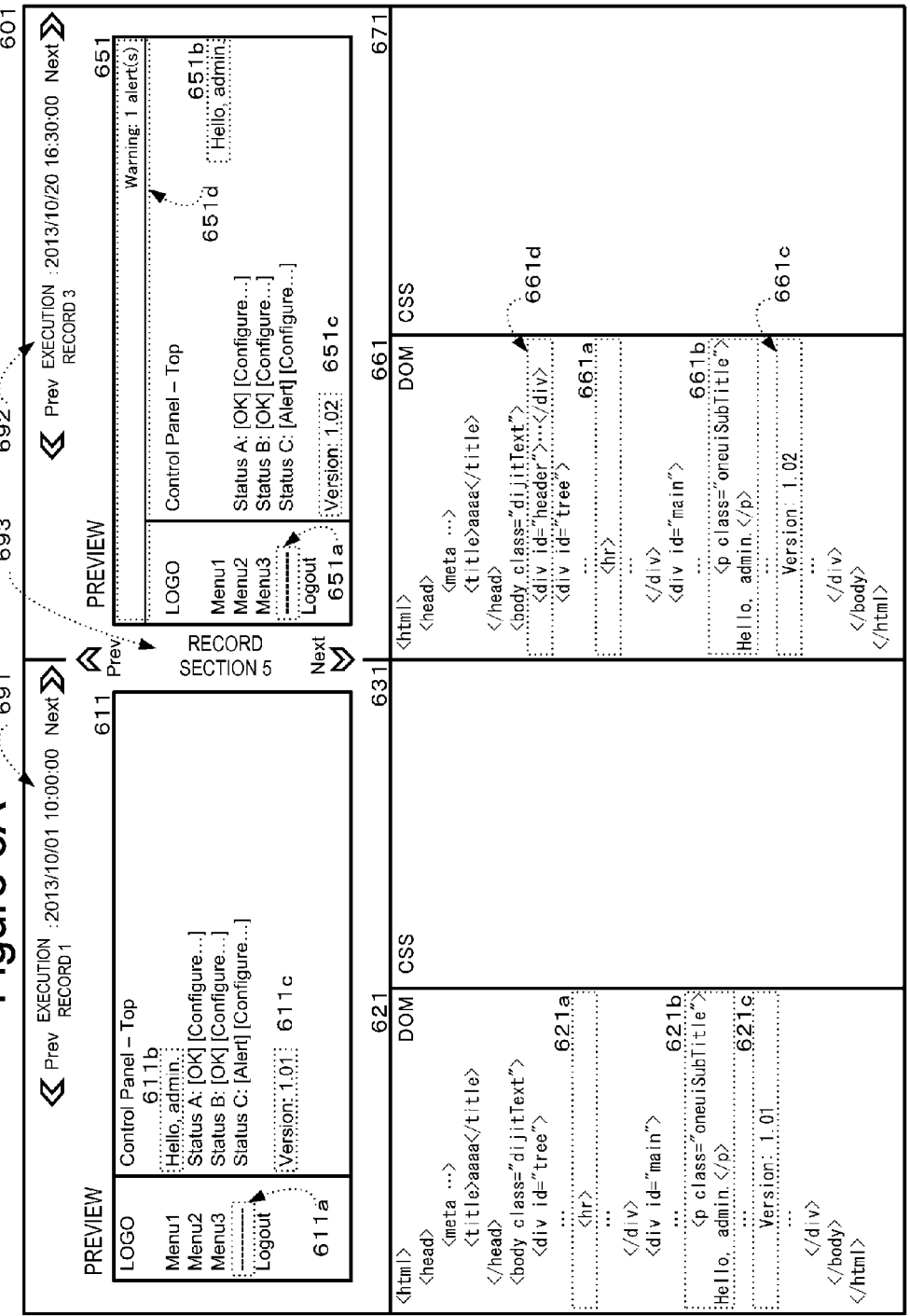

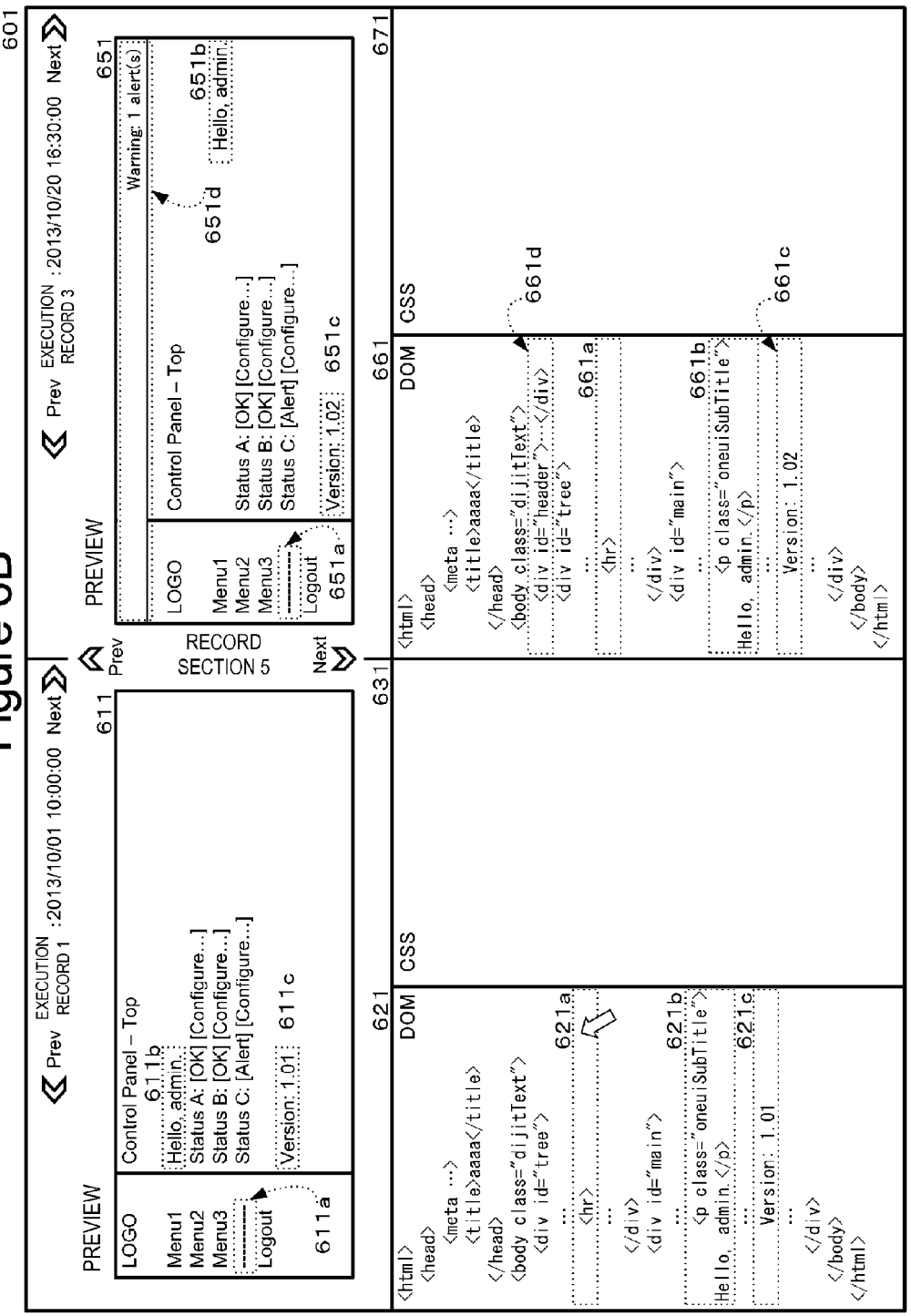

Figure 6C

PREVIEW — Prev « EXECUTION RECORD 1 : 2013/10/01 10:00:00 Next »

611
- LOGO | Control Panel – Top
- Menu1 | Hello, admin. (611b)
- Menu2 | Status A: [OK] [Configure...]
- Menu3 | Status B: [OK] [Configure...]
- Logout (611a) | Status C: [Alert] [Configure...]
- | Version: 1.01 (611c)

621 DOM | CSS

```
<html>
<head>
  <meta ...>
  <title>aaaa</title>
</head>
<body class="dijitText">
  <div id="tree">
    ...
    <hr>          621a
    ...
  </div>
  <div id="main">
    <p class="oneuiSubTitle">   621b
    Hello, admin. </p>
    Version: 1.01        621c
    ...
  </div>
</body>
</html>
```

CSS: hr + height: 1px; (default)  631a

---

RECORD SECTION 5 « Prev   Next »

PREVIEW — Prev « EXECUTION RECORD 3 : 2013/10/20 16:30:00 Next »

651
- LOGO | Control Panel – Top | Warning: 1 alert(s)
- Menu1 | Hello, admin. (651b) | (651d)
- Menu2 | Status A: [OK] [Configure...]
- Menu3 | Status B: [OK] [Configure...]
- Logout (651a) | Status C: [Alert] [Configure...]
- | Version: 1.02 (651c)

661 DOM | CSS 671

```
<html>
<head>
  <meta ...>
  <title>aaaa</title>
</head>
<body class="dijitText">
  <div id="header">...</div>   661a
  <div id="tree">
    ...
    <hr>
    ...
  </div>
  <div id="main">
    <p class="oneuiSubTitle">   661b
    Hello, admin. </p>
    Version: 1.02
    ...
  </div>
</body>
</html>
```

CSS: hr + height: 2px;  661d
/OneUI/OneUITheme.css  671a

PREVIEW — ≪ Prev  EXECUTION :2013/10/01 10:00:00  Next ≫
RECORD 1

811
| LOGO | Control Panel – Top |
|---|---|
| Menu1 | Hello, admin. |
| Menu2 | Status A: [OK] [Configure...] |
| Menu3 | Status B: [OK] [Configure...] |
| ――― | Status C: [Alert] [Configure...] |
| Logout | Version: 1.01 |

≪ Prev  RECORD SECTION 5  Next ≫

PREVIEW — ≪ Prev  EXECUTION :2013/10/10 14:20:00  Next ≫
RECORD 2

851
| LOGO | Control Panel – Top |
|---|---|
| Menu1 | Hello, admin. |
| Menu2 | Status A: [OK] [Configure...] |
| Menu3 | Status B: [OK] [Configure...] |
| ――― | Status C: [Alert] [Configure...] |
| Logout | Version: 1.01 |

821 DOM

```
<html>
  <head>
    <meta ...>
    <title>aaaa</title>
  </head>
  <body class="dijitText">
    <div id="tree">
      ...
      <hr>
    </div>
    <div id="main">
      ...
      <p class="oneuiSubTitle">
Hello, admin. </p>
      ...
      Version: 1.01
    </div>
  </body>
</html>
```

831 CSS  /OneUI/OneUITheme.css

```
.oneuiSubTitle
  + font-size: 10px;
  + text-align: left;
                          /dojo/dijit/dijitTheme.css
.dijitText
  + font-size: large;
  + font-family: helvetica;
```

861 DOM

```
<html>
  <head>
    <meta ...>
    <title>aaaa</title>
  </head>
  <body class="dijitText">
    <div id="tree">
      ...
      <hr>
    </div>
    <div id="main">
      ...
      <p class="oneuiSubTitle">
Hello, admin. </p>
      ...
      Version: 1.01
    </div>
  </body>
</html>
```

871 CSS  /OneUI/OneUITheme.css

```
.oneuiSubTitle
  + font-size: 10px;
  + text-align: left;
                          /dojo/dijit/dijitTheme.css
.dijitText
  + font-size: large;
  + font-family: helvetica;
```

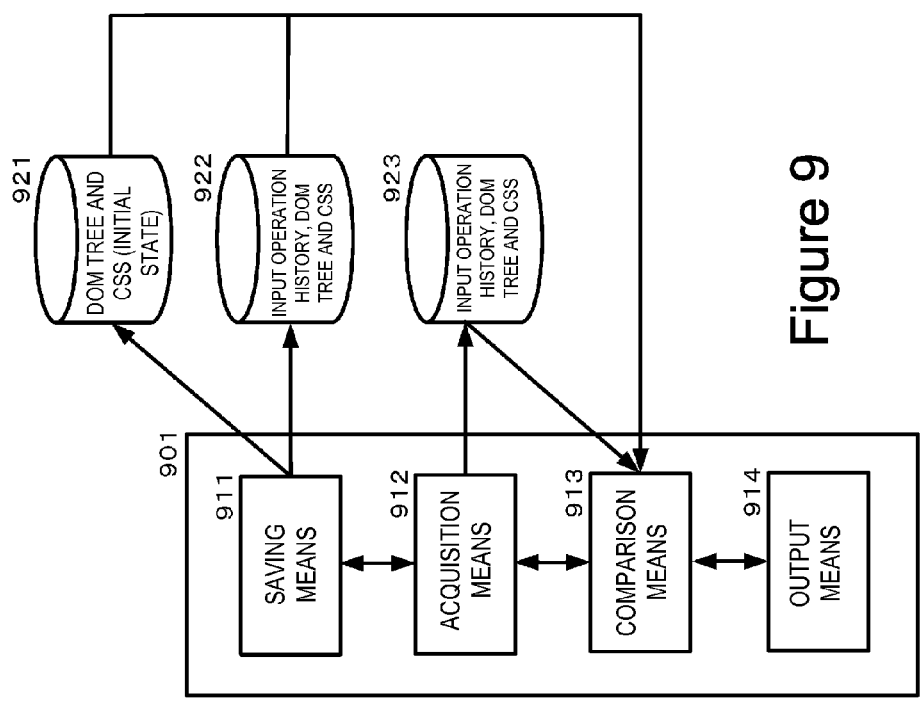

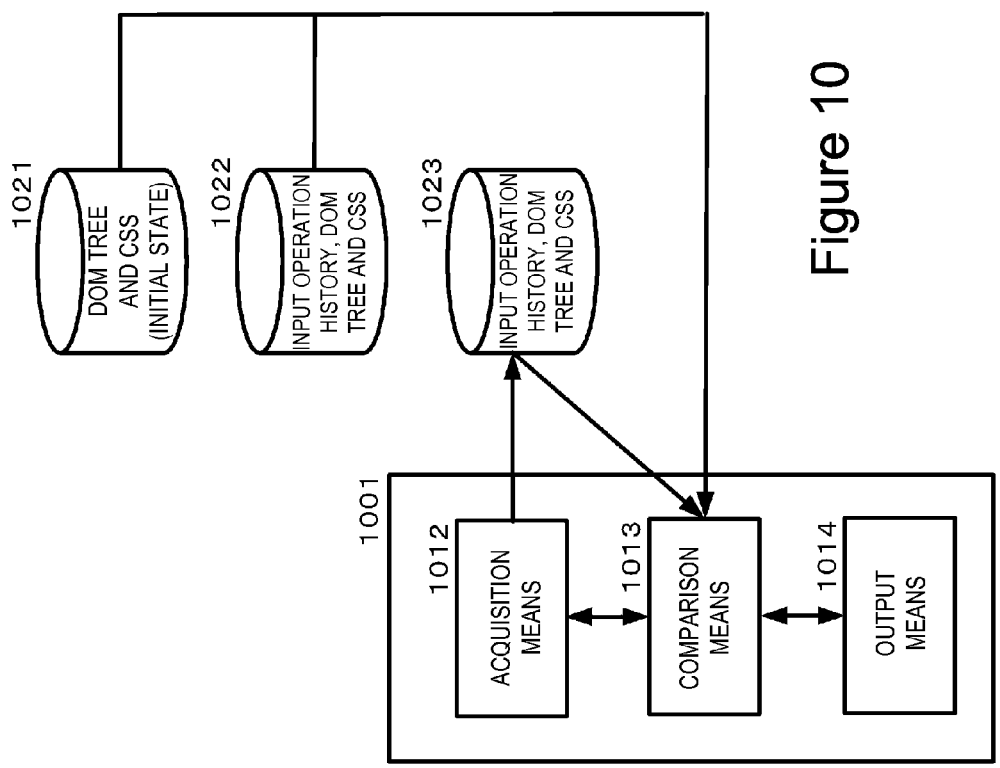

DETECTING INFLUENCE CAUSED BY CHANGING THE SOURCE CODE OF AN APPLICATION FROM WHICH A DOCUMENT OBJECT MODEL TREE AND CASCADING STYLE SHEET MAY BE EXTRACTED

FOREIGN PRIORITY

This application claims priority to Japanese Patent Application No. 2013-252681, filed 6 Dec. 2013, and all the benefits accruing therefrom under 35 U.S.C. §119, the contents of which in its entirety are herein incorporated by reference.

BACKGROUND

Embodiments of this disclosure relate to document object model (DOM) trees and cascading style sheets (CSSs) and, more particularly, to techniques for detecting an influence that is caused by changing the source code of an application from which a DOM tree and CSS may be extracted.

A screen, e.g., web page, displayed by a web application may be changed by changing the source code of the web application (for example, by correcting a bug or by changing the specification). Thus, when the source code of a web application is changed, whether regression or degradation has occurred should be checked. Normally, for this checking, a tester performs a visual regression test, while operating the web browser, for all associated screens of the web application every time the source code is changed.

However, manually performing every regression test is extremely costly. Accordingly, normally, the regression test is performed only for the portions of the screens assumed to be influenced by a change in the source code of the web application. However, with such regression tests, regression or degradation often occurs due to a failure in finding all the portions of the web pages that may be influenced.

Also, for example, when a common JavaScript® framework (for example, Dojo Toolkit, jQuery, or prototype.js) that may influence the entire web application is changed, the regression test has to be performed for all screens. However, if a web page is hierarchized by using the JavaScript framework mentioned above and is dynamically created, investigation of the range of influence on the web page caused by changing the source code is extremely difficult. Also, since the regression test on a web application is a work of repeating a similar operation over and over again, this is an extremely boring work for the tester.

Accordingly, pieces of software for automating the regression test on a web application are being provided. For example, these pieces of software are Selenium, which is open source software, and IBM® Rational® Functional Tester (see Kazunari Hohshoh, et al., "Effective System Development Practice Using Tools—Aiming at Smarter System Development," IBM Japan, Provision Spring No. 69, 2011), SmartBear TestComplete, and HP® QuickTest Professional, which are commercial products. All of Selenium, IBM Rational Functional Tester, SmartBear TestComplete, and HP QuickTest Professional adopt a white list method for performing a regression test while clearly indicating the comparison portion.

With Selenium, the regression test may be almost entirely automatically performed by creating a test case for a web application. Also, because Selenium enables the regression test to be easily performed on a plurality of web browsers, the efficiency of the regression test on web applications may be increased.

Japanese Patent Publication No. JP2009-140155A describes a test program for an application program. This test program causes a computer on which an application program is installed to function as a recording control means for cumulatively recording, in a recording device, user events and screen events generated by the application program at a time of execution of a test case on the application program; an execution means for reading the user events and the screen events cumulatively recorded in the recording device, and sequentially executing the user events by the application program that is a test target; and an error output control means for comparing a screen event generated from execution of one user event by the application program that is a test target to execution of a next user event and a screen event generated from execution of the one user event read out from the recording device to execution of the next user event, and for outputting the screen events that do not coincide as an error.

Furthermore, Japanese Patent Publication No. JP2009-140155A describes that the screen event cumulatively recorded in the recording device by the recording control means is a difference of screen change, and is information to be acquired by DOM, and that the screen event cumulatively recorded in the recording device by the recording control means is information indicated by a changed portion expressed by Xpath and a DOM subtree.

Japanese Patent Publication No. JP2013-54693A describes a regression test support program. The regression test support program causes a computer to perform a method of detecting an update of display contents of one of one or more browser screens displayed on a display; recording in a first storage unit, every time the update is detected, data including information indicating the display contents of all of the browser screens displayed and identification information of the browser screen related to the update; referring to the first storage unit according to an edit instruction for the data; and displaying a list of images indicating the display contents of the browser screen associated with the identification information.

SUMMARY

One embodiment is a computer-implemented method for detecting an influence caused by changing a source code of an application from which a document object model (DOM) tree and cascading style sheets (CSSs) are extracted. The method includes saving one or more input operations of a user of the application, a DOM tree, and a CSS for each of one or more times that an instruction is received to check a screen state. After the source code is changed, the one or more input operations are emulated in an operation order, for each of the one or more times. A DOM tree and CSS are acquired for each of the one or more times. The saved DOM tree and CSS are compared with the acquired DOM tree and CSS for each of the one or more times. A result of the comparison is output.

Another embodiment is a system for detecting an influence caused by changing a source code of an application from which a DOM tree and CSSs are extracted. The system includes a memory and one or more processors communicatively coupled to the memory. The one or more processors are configured to save one or more input operations of a user of the application, a DOM tree, and a CSS for each of one or more times that an instruction is received to check a screen state. The one or more processors are further configured to emulate, after the source code is changed, the one or more input operations in an operation order, for each of the one or more times. The one or more processors are further configured to acquire a DOM tree and CSS for each of the one or more times. The one or more processors are further configured to compare the saved DOM tree and CSS with the acquired DOM tree and CSS for each of the one or more times, and to output a result of the comparison.

Yet another embodiment is a computer program product for detecting an influence caused by changing a source code of an application from which a DOM tree and CSSs are extracted. The computer program product includes a computer readable storage medium having program instructions embodied therewith. The program instructions are executable by a processor to cause the processor to perform a method. The method includes saving one or more input operations of a user of the application, a DOM tree, and a CSS for each of one or more times that an instruction is received to check a screen state. Further according to the method, after the source code is changed, the one or more input operations are emulated in an operation order, for each of the one or more times. A DOM tree and CSS are acquired for each of the one or more times. The saved DOM tree and CSS are compared with the acquired DOM tree and CSS for each of the one or more times. A result of the comparison is output.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

FIG. 6A illustrates, according to the embodiment of this disclosure, detection of an influence that is caused by the change in source code, and an example output of the result of the detection;

FIG. 6B illustrates, according to the embodiment of this disclosure, detection of an influence that is caused by the change in source code, and an example output of the result of the detection;

FIG. 6C illustrates, according to the embodiment of this disclosure, detection of an influence that is caused by the change in source code, and an example output of the result of the detection;

FIG. 8C illustrates, according to the embodiment of this disclosure, detection of an influence that is caused by the change in source code, and an example output of the result of the detection;

FIG. 9 is a block diagram of a detection system for detecting an influence caused by the change in source code according to the embodiment of this disclosure; and FIG. 10 is a second block diagram detection system for detecting an influence caused by the change in source code according to the embodiment of this disclosure.

DETAILED DESCRIPTION

Figure 1:
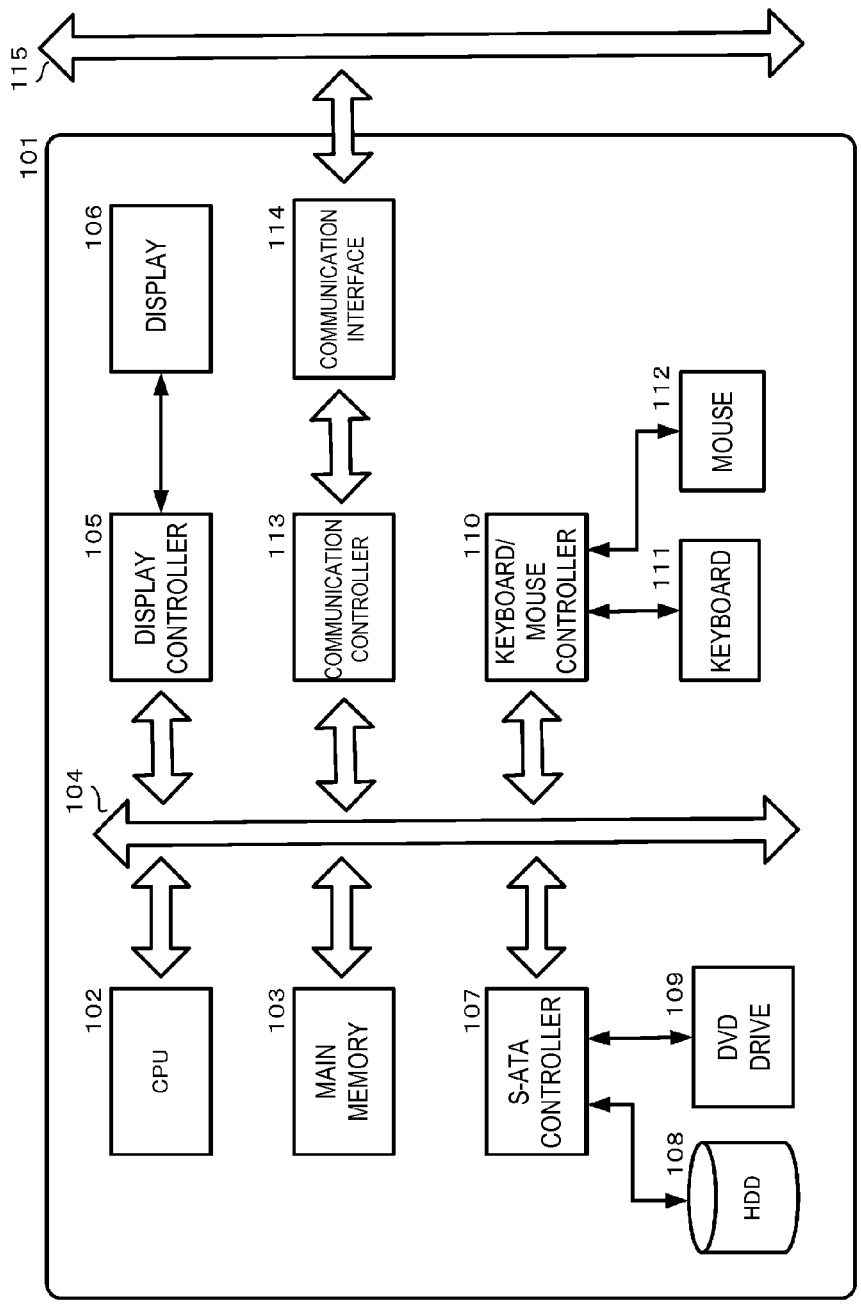
FIG. 1 is a diagram showing an example of a computer which may be used in an embodiment of this disclosure.

Embodiments of a detection system according to this disclosure will be described below with reference to the drawings. In the drawings described below, the same reference sign is applied to the same object unless stated otherwise. The described embodiments are presented for illustrative purposes only and should be understood to not limit the scope of the present invention to that described herein.

Detection of an influence that is caused by changing the source code of an arbitrary application from which a DOM tree and CSS may be extracted is important for a regression test for the application, a unit test for the application, or a code study for building the application. Accordingly, embodiments of the detection system may enable automatic detection of an influence that is caused by changing the source code of the application.

Also, to check that the application is compatible with various web browsers or different versions of a same web browser, a test has to be performed by the number of times "the number of browsers×the number of versions," and this is extremely costly. Furthermore, even if the web browser is the same, if the behavior of the application (including behaviors of screen display and invisible regions other than the screen display) is to be checked for each of operating systems such as Windows®, Mac OS® X, Linux®, Android® and iOS®, and for each supported version, the cost will be further increased. Accordingly, to reduce the cost, the embodiments of the detection system may enable automatic detection of an influence that is caused by changing the source code of the application.

Furthermore, the detection system may eliminate, for a case where conventional software for automating a regression test on a web application uses the white list method, the need to separately write a definition desired by the white list method (for example, a definition such as "value of an item X is supposed to be ABC"), a test case, or a unified modeling language (UML).

Still further, the detection system may enable detection of a problem regarding design (for example, line offset, painting failure, or overlapping items). Particularly, some embodiments of the detection system may detect a difference that is not shown on a screen display (for example, a difference in an invisible region or a difference due to a display size).

Still further, the detection system may enable automatic determination regarding a portion of screens with respect to which a definition desired by the white list method is difficult and with respect to which the eyes of a user are relied upon.

Still further, the detection system may detect an influence that is caused by changing the source code of the application while reducing the involvement of a user as much as possible.

The detection system may provide a technique for detecting an influence that is caused by changing the source code of an arbitrary application from which a DOM tree and CSS may be extracted. This technique may include a method for detecting an influence that is caused by changing the source code of the application, a computer for detecting the influence, a computer program, and a computer program product.

A computer that may be used in some embodiments of the detection system is not particularly limited as long as the computer is capable of detecting an influence that is caused by changing the source code of an application from which a DOM tree and CSS may be extracted. For example, this computer may be a desktop computer, a notebook computer, an all-in-one computer, a tablet or a smartphone terminal (for example, a tablet or a smartphone loaded with Windows, Android, or iOS).

In embodiments of this disclosure, "DOM tree" represents an XML or HTML document as a tree structure. For example, an XML document has logically a tree structure and includes a root, which appears first, and one or more node elements or attributes (branches or leafs) that extend from the root. With the DOM, an XML document that is read is converted to a tree structure. Data of the tree structure forms a DOM tree. For example, some web applications (for example, a web browser) include, as standard or add-on, a function for accessing a DOM tree of a displayed page and for displaying or editing the DOM tree. These are, for example, Google Chrome® Developer Tools, the developer tools of Internet Explorer (registered trademark), or Firebug®, which is a developer add-on for Firefox®.

In some embodiments, "CSS" is one of the specifications by W3C for indicating how an element of an XML or HTML document is to be decorated (or displayed), and provides information about visual effects, such as fonts, size of text, text decoration, space between lines, and the like. For example, some web applications (for example, a web browser) include, as standard or add-on, a function for accessing CSS of a displayed page and for displaying or editing the CSS. These are, for example, Google Chrome Developer Tools, the developer tools of Internet Explorer, or Firebug, which is a developer add-on for Firefox. In this specification, "CSS" may be inherited from a parent element.

The CSS may include a CSS property (which is also a setting item) and the value of the CSS property. For example, in a definition "font-size: 12px;", the CSS property is "font-size," and the value defined for the CSS property is "12px."

In some embodiments, the application from which a DOM tree and CSS may be extracted may be any application only as long as a DOM tree and CSS may be extracted therefrom. In other words, the application from which a DOM tree and CSS may be extracted may be an arbitrary application configured by using a DOM tree and CSS.

Particularly, the application from which a DOM tree and CSS may be extracted may be an arbitrary dynamic application that is dynamically built by a framework (for example, a JavaScript framework), a component (for example, a component provided by an application developer), or a combination thereof. The JavaScript framework may be Dojo Toolkit, jQuery, or prototype.js, for example. The arbitrary application mentioned above may be a web application that is used over a network, such as the Internet or an intranet.

In many cases, a web application operates by cooperation between, first, a program based on a programming language (for example, JavaScript) and operating on a web browser and, second, a program on the web server side. A user may run the web application on a web browser, for example. A web browser may be Internet Explorer, Google Chrome, Safari®, Firefox, or the like.

A web application may operate as an application for a blog, an online bulletin board, online banking, online trading, online shopping, or the like.

In some embodiments, source code of an application from which a DOM tree and CSS may be extracted is a framework (for example, JavaScript framework) building the application from which a DOM tree and CSS may be extracted and a component (for example, a component provided by an application developer).

When the source code of the application is changed, if the same DOM tree and the CSS are obtained at different times, difference in invisible regions and difference in display sizes would be the same in the results displayed on a display screen, at least in the same web application (and the same version).

FIG. 1 is a diagram showing an example of a computer that may be used in some embodiments of this disclosure.

A computer 101 includes a central processing unit (CPU) 102 and a main memory 103, and these are connected to a bus 104. The CPU 102 is preferably based on a 32-bit or 64-bit architecture. The CPU 102 may be of Core™ i series, Core™ 2 series, Atom™ series, Xeon® series, Pentium® series, or Celeron® series of Intel Corporation; A series, Phenom™ series, Athlon Series®, Turion® series, or Sempron® of AMD (Advanced Micro Devices); or Power™ series of International Business Machines Corporation, for example.

A display 106, such as a liquid crystal display (LCD), may be connected to the bus 104 via a display controller 105. Also, the LCD may be a touch panel display or a floating touch display, for example. The display 106 may be used to display, on an appropriate graphical interface, an object that may be displayed by the operation of software (for example, operation of a computer program according to this disclosure or various computer programs running on the computer 101) running on the computer 101. Also, the display 106 may output the DOM tree, the CSS, and the result of comparison according to some embodiments.

A disk 108, such as a hard disk or a solid state drive (SSD), may be optionally connected to the bus 104 via a SATA or IDE controller 107, for example.

A drive 109, such as a CD, DVD, or BD, drive may be optionally connected to the bus 104 via the SATA or IDE controller 107, for example.

A keyboard 111 and a mouse 112 may be optionally connected to the bus 104 via a peripheral device controller 110, for example, via a keyboard mouse controller or a USB bus.

An operating system (e.g., Windows, Mac OS X, Linux, Android, or iOS), Java® processing environment (e.g., J2EE), Java application, Java virtual machine (VM), Java just-in-time (JIT) compiler, a computer program according to the embodiment of the present invention, other programs, and data are stored in the disk 108 in a manner capable of being loaded on a main memory 103.

The disk 108 may be built into the computer 101, may be connected via a cable in a manner allowing access by the computer 101, or may be connected via a wired or wireless network in a manner allowing access by the computer 101.

The drive 109 may be used as necessary to install, on the disk 108, from a CD-ROM, a DVD-ROM, or a BD, a program such as an operating system, an application, or a computer program according to some embodiments.

A communication interface 114 conforms to Ethernet® protocol, for example. The communication interface 114 is connected to the bus 104 via a communication controller 113, serves the role of connecting the computer 101 to a communication line 115 in a wired or wireless manner, and provides a network interface layer for the TCP/IP communication protocol of a communication function of the operating system of the computer 101. Additionally, the communication line may be a wireless LAN environment based on a wireless LAN connection standard, a Wi-Fi wireless LAN environment such as IEEE802.11a/b/g/n, or a mobile phone network environment (for example, a 3G or 4G environment).

With reference to FIGS. 2, 3, 4A and 4B described below, flow charts for detecting an influence that is caused by changing the source code of an application from which a DOM tree and CSS may be extracted will be described according to embodiments of this disclosure. Additionally, in the description of FIGS. 2, 3, 4A and 4B described below, "application" refers to an application from which a DOM tree and CSS may be extracted.

In the following, terms "execution record", "record section", and "timing information" will be used, and these terms are defined as below.

The "execution record" refers to an entire attempt of a test case, and one test attempt is defined as an execution record. For example, one test attempt takes as one unit blocks 203 to 216 shown in FIG. 2, described below, or blocks 303 to 314 shown in FIG. 3, also described below. With respect to one test attempt, the first test attempt is expressed as an execution record 1, the second test attempt as an execution record 2, and the third test attempt as an execution record 3, for example.

The "record section" is a unit obtained by dividing the execution record, which is the entire attempt of a test case, into a set of chunks (e.g., a user performs a certain operation, and presses a save button for a DOM tree and CSS). The "record section" is expressed as a record section i, where i is an arbitrary integer between 0 and n, in the order of recording. The record section is defined by receiving a trigger for saving a DOM tree and CSS from a user. The record section i expresses a section from an i−1-th trigger operation to an i-th operation. Accordingly, the record section 0 is a section of a corresponding execution record holding a DOM tree and CSS in an initial state where there is no input operation by the user. Then, the first trigger to the second trigger is expressed as the record section 1, the second trigger to the third trigger as the record section 2, the third trigger to the fourth trigger as the record section 3, and the n−1-th trigger to the n-th trigger, which is the last trigger, as the record section n. This record section n is the maximum value for the record section in the corresponding execution record.

Figure 2:
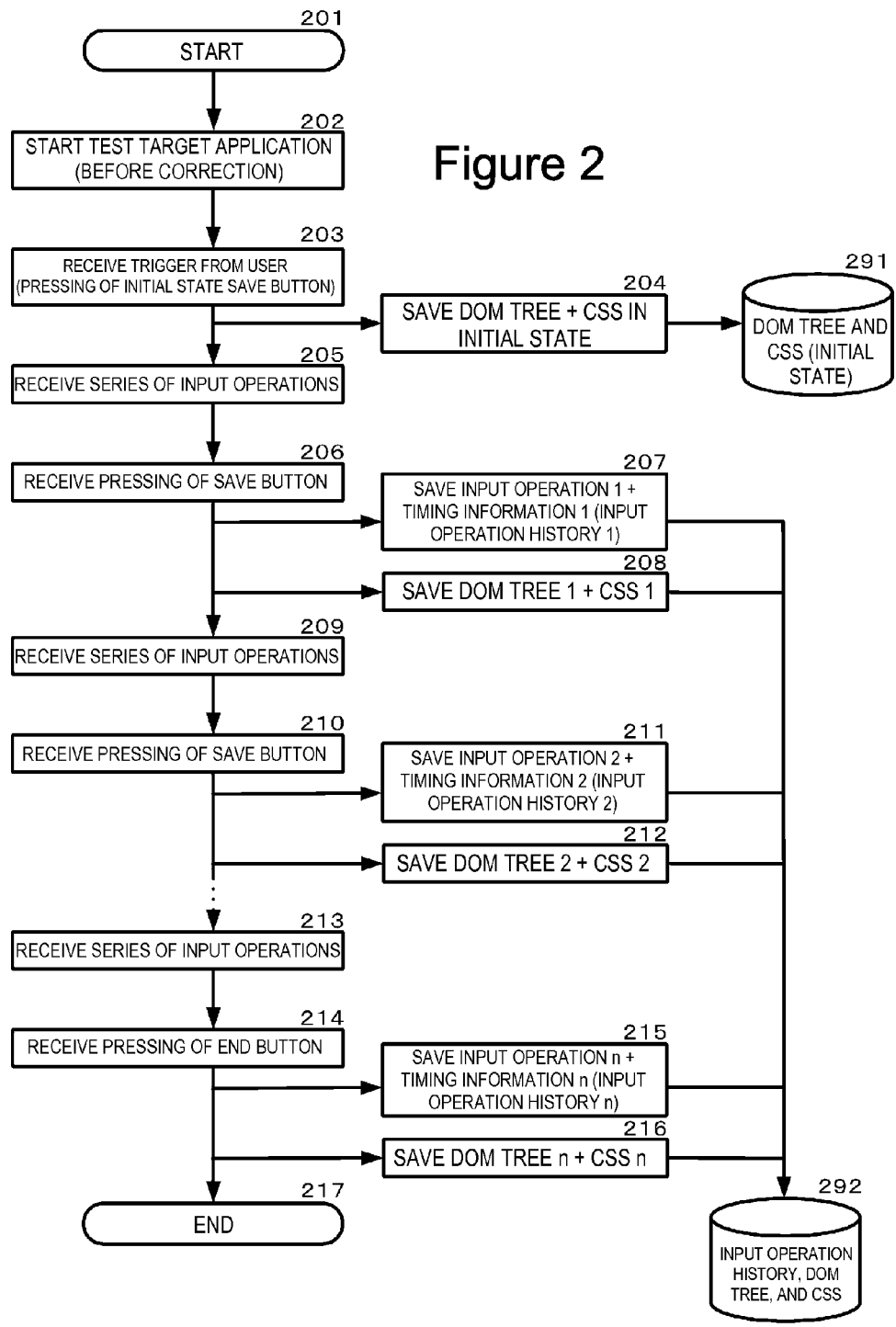
FIG. 2 illustrates a flow chart, according to the embodiment of this disclosure, of a method of saving, to detect an influence that is caused by changing the source code of an application from which a DOM tree and CSS may be extracted, an input operation of a user on an application, and a DOM tree and CSS for each given time when a screen state is desired to be checked.

For example, in FIG. 2, record section 0 is indicated by blocks 203 and 204, record section 1 is indicated by blocks 205 to 208, record section 2 is indicated by blocks 209 to 212, and record section n is indicated by blocks 213 to 216. That is, with respect to record section i, the 0 may be used to express the span from the start of a test target application (before correction) to an instant of first pressing a save button. Also, with respect to record section i, the arbitrary integer i between 1 to n may express the i−1-th pressing of a save button to an instant of the i-th pressing of the save button or pressing an end button. Similarly, in FIG. 3, to coincide with the record sections saved in FIG. 2, record section 0 is indicated by blocks 303 and 304, record section 1 is indicated by blocks 306 to 308, record section 2 is indicated by blocks 309 to 311, and record section n is indicated by blocks 312 to 314.

The "timing information" refers to time information, with respect to an operation performed by a user, for reproducing the order or the operation interval. Accordingly, when referring to timing information i, this means relative time information of an operation performed by a user in the record section i. Thus, i is defined by 1 to n for the timing information i.

FIG. 2 illustrates a flow chart, according to some embodiments of this disclosure, of a method of saving, to detect an influence that is caused by changing the source code of the application, an input operation of a user on the application, as well as a DOM tree and CSS for each of at least one given time when a screen state is desired to be checked.

Each block in the flow chart shown in FIG. 2 is performed just once before performing a regression test (e.g., the methods shown in FIG. 3, and FIGS. 4A and 4B), for example, when detection of an influence that is caused by changing the source code of the application that is the test target is performed for a regression test.

In block 201, the computer starts the method of saving an input operation of a user on the application, and a DOM tree and CSS for each of at least one given time when a screen state is desired to be checked. With respect to the application, it is assumed that a change is not yet made to the source code of the application.

In block 202, the computer starts the application, which may be, for example, according to an application start instruction received from the user.

In block 203, the computer receives from the user a trigger for saving a DOM tree and CSS of the application, which are in the initial state. The corresponding execution record is divided by this trigger, and a section between successive triggers is defined as the record section. The trigger may be detection of pressing, by the user, of a specific key (for example, a specific function key) of a keyboard, which is set as an initial state save button. The computer acquires, according to receipt of the trigger at the time the specific key is pressed, a DOM tree and CSS that is applied to each DOM element in the DOM tree. The DOM tree and the CSS applied to each DOM element in the DOM tree are automatically created by the computer analyzing a response from a web server by using a browser on the display screen to render each element in the browser, and they correspond to the content displayed on the browser at the time of pressing of the specific key. The same can be said for blocks 206, 210, and 214 described below. Examples of the DOM tree acquired and the CSS applied to each DOM element in the DOM tree are shown in FIG. 5B, which is described below.

In block 204, the computer saves each of the DOM tree and the CSS in the initial state, which were acquired in block 203, in a storage medium 291. The CSS to be saved may include, for each DOM element in the DOM tree, a CSS property to be applied to the DOM element and a definition location of the CSS property. Incidentally, when the CSS property to be applied to the DOM element in the DOM tree is undefined, the computer may acquire a value that is to be used as an initial value for each DOM element, and may save the value in the storage medium 291. The value that is to be used as an initial value is not limited to a value defined in a CSS file (that is, a value that is actually written in the CSS file). Also, the computer may capture a screenshot on the application, and save the screenshot in the storage medium 291. The storage medium 291 may be the disk 108 shown in FIG. 1, for example. In the following, the DOM tree and the CSS that are saved will be referred to as the DOM tree and the CSS of the record section 0 (the initial state, i=0).

In block 205, the computer receives a series of the user's input operations performed after the initial state save button was pressed in block 203 (hereinafter referred to as input operation 1). The computer may receive this input operation every time the input operation is performed (for example, at the same time as the input operation is performed), and may save the input operation in a storage medium 292. An input operation includes, for example, an input operation by a keyboard, an input operation by a pointing device, an input operation by a touch panel, and an input operation by audio input. The pointing device may be a mouse, a pointing stick (such as TrackPoint®), a touch pad, a track ball, or a joy pad, for example.

In block 206, the computer detects pressing, by the user, of a save button (for example, a specific function key) that indicates it is currently a time when the screen state is desired to be checked. The computer acquires a DOM tree and CSS applied to each DOM element in the DOM tree at the time of pressing of the save button. The computer defines a section after the previous trigger record section 0 (i=0) as a record section 1 (i=1), according to the detection that the save button was pressed, for example.

When the input operation 1 is not saved in block 205, the computer may save the input operation 1 in the storage medium 292 in block 207. The storage medium 292 may be the same as, or different from, the storage medium 291, and may be the disk 108 shown in FIG. 1, for example. Also, the computer saves, as timing information 1, in the storage medium 292, timing information regarding execution of each input operation of the input operation 1 (e.g., time information regarding the order of execution of event information, such as coordinate information or reference to an element with respect to which an input operation has been performed; input operations and the interval between the input operations). The input operation 1 and the timing information 1 may together be referred to as an input operation history 1.

In block 208, the computer saves, in the storage medium 292, each of the DOM tree and the CSS acquired in block 206 as information about the record section 1 (i=1). The CSS that is saved may include, for each DOM element in the DOM tree, a CSS property to be applied to the DOM element and a definition location of the CSS property. Incidentally, when the CSS property to be applied to the DOM element in the DOM tree is undefined, the computer may acquire a value that is to be used as an initial value for each DOM element, and may save the value in the storage medium 292. Also, the computer may capture a screenshot on the application, and may save the screenshot in the storage medium 292. In the following, the DOM tree and the CSS that have been saved will be referred to as the DOM tree and the CSS of the record section 1 (i=1). The computer may perform the operations of block 207 and 208 at the same time, or in the order of block 207 and block 208, or in the order of block 208 and block 207.

In block 209, the computer receives a series of input operations of the user performed after the save button has been pressed in block 206 (hereinafter referred to as input operation 2). The computer may receive this input operation every time the input operation is performed (for example, at the same time as when the input operation is performed), and may save the input operation in the storage medium 292.

In block 210, the computer detects pressing, by the user, of the save button that indicates it is currently a time when the screen state is desired to be checked. The computer acquires a DOM tree and CSS applied to each DOM element in the DOM tree at the time the save button is pressed. The computer defines a section after the record section 1 (i=1) as a record section 2 (i=2), according to the detection of the pressed save button, for example.

If the input operation 2 is not saved in block 209, the computer may save the input operation 2 in the storage medium 292 in block 211. Also, the computer saves, in the storage medium 292, timing information regarding execution of each input operation of the input operation 2 as timing information 2.

In block 212, the computer saves, in the storage medium 292, each of the DOM tree and the CSS acquired in block 210 as information about the record section 2 (i=2). The CSS that is saved may include, for each DOM element in the DOM tree, a CSS property to be applied to the DOM element and a definition location of the CSS property. Incidentally, when the CSS property to be applied to the DOM element in the DOM tree is undefined, the computer may acquire a value that is to be used as an initial value for each DOM element, and may save the value in the storage medium 292. Also, the computer may capture a screenshot on the application, and may save the screenshot in the storage medium 292. In the following, the saved DOM tree and CSS will be referred to as the DOM tree and the CSS of the record section 2 (i=2). The computer may perform the operations of block 211 and 212 at the same time, or in the order of block 211 and block 212, or in the order of block 212 and block 211.

In block 213, the computer receives a series of input operations of the user performed after the save button has been pressed by an input operation n−1 of the user (hereinafter referred to as input operation n). The computer may receive the input operation every time the input operation is performed (for example, at the same time as when the input operation is performed), and may save the input operation in the storage medium 292.

In block 214, the computer detects pressing, by the user, of an end button (for example, a specific function key) that indicates the end of a given time when the screen state is desired to be checked. The computer acquires a DOM tree and CSS applied to each DOM element in the DOM tree at the time the end button is pressed.

If the input operation n is not saved in block 213, the computer may save the input operation n in the storage medium (292) in block 215. Also, the computer saves, in the storage medium (292), timing information regarding execution of each input operation of the input operation n as timing information n.

In block 216, the computer saves, in the storage medium 292, each of the DOM tree and the CSS acquired in block 215 as information about the record section n (i=n). The CSS that is saved may include, for each DOM element in the DOM tree, a CSS property to be applied to the DOM element and a definition location of the CSS property. Incidentally, when the CSS property to be applied to the DOM element in the DOM tree is undefined, the computer may acquire a value that is to be used as an initial value for each DOM element, and may save the value in the storage medium 292. Also, the computer may capture a screenshot on the application, and may save the screenshot in the storage medium 292. In the following, the saved DOM tree and CSS will be referred to as the DOM tree and the CSS of the record section n (i=n). The computer may perform the operations of block 215 and 216 at the same time, or in the order of block 215 and block 216, or in the order of block 216 and block 215.

In block 217, the computer ends the method of saving an input operation of the user on the application, and a DOM tree and CSS for each of at least one given time when a screen state is desired to be checked.

In the example shown in FIG. 2, the input operations 1, 2, . . . , n are shown for a case where the input operation by the user is performed n times. However, this is not to eliminate a case where the input operation by the user ends with the input operation 1 or with the input operation 2, and it should be noted that the last record section n (i=n) is determined according to the pressing of the end button indicated in block 214.

Figure 3:
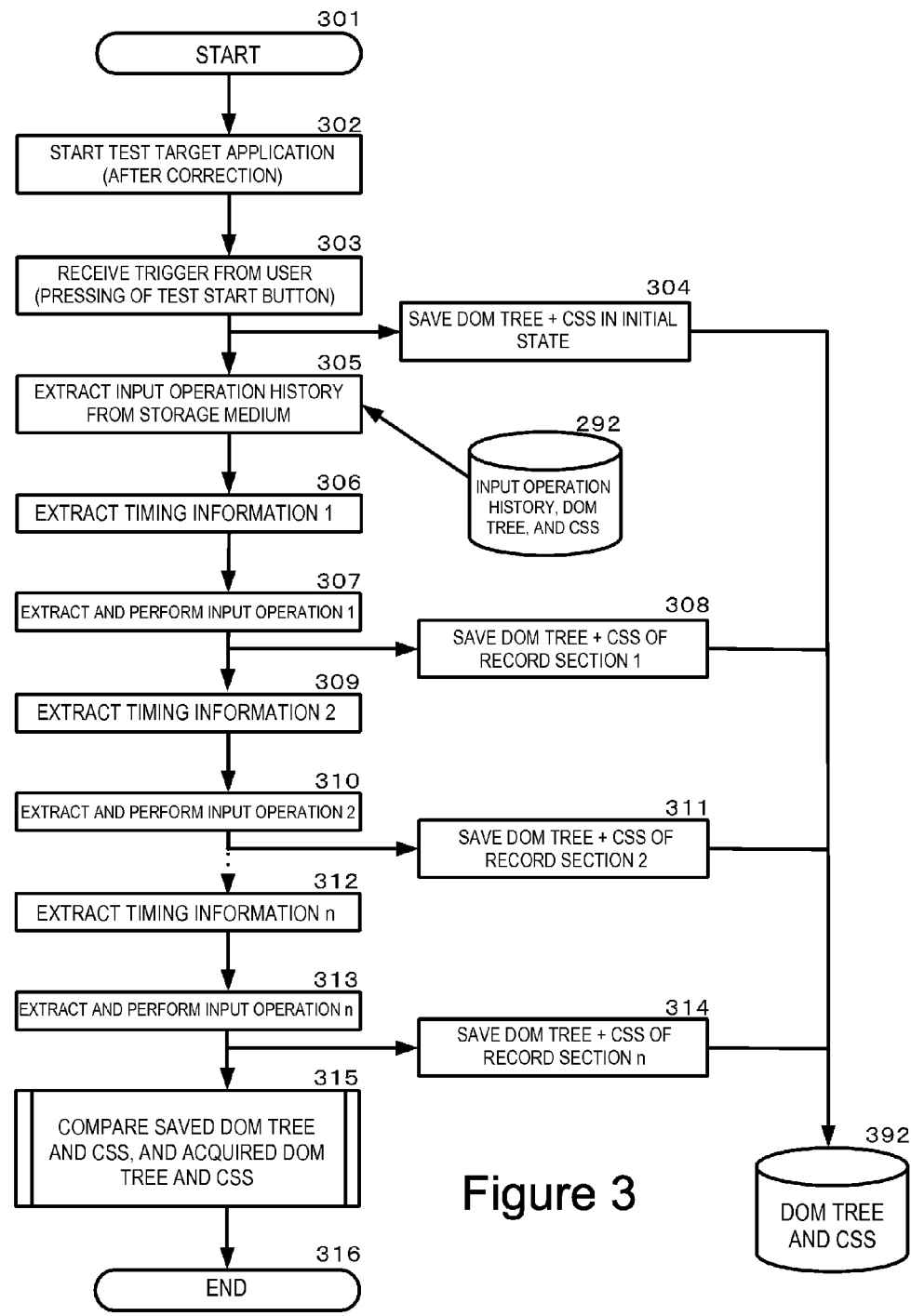
FIG. 3 illustrates a flow chart, according to the embodiment of this disclosure, of a method of saving, after the method of the flow chart shown in FIG. 2 is completed, a DOM tree and CSS while emulating input operations performed in FIG. 2 in the operation order, and detecting an influence that is caused by changing the source code of a web application.

FIG. 3 illustrates a flow chart, according to the embodiment of this disclosure, of a method of saving, after the method of the flow chart shown in FIG. 2 is completed, a DOM tree and CSS while emulating input operations 1, 2, . . . , n performed in FIG. 2 in the operation order, and detecting an influence that is caused by changing the source code of the application.

Each block in the flow chart shown in FIG. 3 is performed after the source code is changed, if detection of an influence that is caused by changing the source code of the application is performed for a regression test, a unit test, or a code study for building the application.

A regression test is performed by a tester other than a source code author on the assumption that a source code change made by the source code author does not influence the display result of the scenario, to check whether there is a difference between the source code before the change and the source code after the change.

A unit test may be performed such that a source code author may easily specify the portion (for example, external output) of the web application that is influenced by the source code change (i.e., an internal change) made by the source code author, for example.

Like the unit test described above, a code study may be performed by an inexperienced source code author in a primary stage of source code development to check the association between the description of the source code and the output result of the application.

The computer that is the execution body of each block shown in FIG. 3 may be the same computer as the computer that is the execution body of each block shown in FIG. 2 (see FIG. 9, described below), or it may be a different computer (see FIG. 10, described below).

In block 301, the computer starts a method of saving a DOM tree and CSS while emulating the input operations 1, 2, . . . , n performed in FIG. 2 in the operation order, and detecting an influence that is caused by changing the source code of the application.

The application is assumed to have been obtained by making a change to the source code of the application executed in FIG. 2.

This method may be started at the time of running a regression test after a change has been made to the source code of the application, for example.

In block 302, the computer starts the application after receiving the application start instruction from the user, for example.

In block 303, the computer receives from the user a trigger for saving a DOM tree and CSS which are in the initial state of testing start for the application. The trigger may be detection of pressing, by the user, of a specific key (for example, a specific function key), of a keyboard, which is set as a testing start button. The computer acquires, based on receiving the trigger, a DOM tree at the time the specific key is pressed, and CSS that is applied to each DOM element in the DOM tree (corresponding to the initial state in block 203 in FIG. 2).

In block 304, the computer saves each of the DOM tree and the CSS in the initial state, that were acquired in block 303, in a storage medium 392. The CSS to be saved may include, for each DOM element in the DOM tree, a CSS property to be applied to the DOM element and a definition location of the CSS property. Incidentally, if the CSS property to be applied to the DOM element in the DOM tree is undefined, the computer may acquire a value that is to be used as an initial value for each DOM element, and may save the value in the storage medium 392. Also, the computer may capture a screenshot on the application, and save the screenshot in the storage medium 392. The storage medium 392 may be the disk 108 shown in FIG. 1, for example. In the following, the DOM tree and the CSS that are saved will be referred to as the DOM tree and the CSS of the record section 0 (the initial state, i=0).

In block 305, the computer extracts the input operation histories (e.g., the input operation histories 1 to n) from the storage medium 292.

In block 306, the computer extracts the timing information 1 from the input operation history 1 extracted in block 305.

In block 307, the computer extracts the input operation 1 from the input operation history 1 extracted in block 305, and emulates and performs the input operation 1 according to the timing information 1 extracted in block 306. The computer acquires, at the end of emulation of the input operation 1, a DOM tree at the time of the end (that is, of the timing information 1) and CSS to be applied to each DOM element in the tree.

In block 308, the computer saves each of the DOM tree and the CSS of the timing information 1, which were acquired in block 307, in the storage medium 392. The CSS to be saved may include, for each DOM element in the DOM tree, a CSS property to be applied to the DOM element and a definition location of the CSS property. Incidentally, when the CSS property to be applied to the DOM element in the DOM tree is undefined, the computer may acquire a value that is to be used as an initial value for each DOM element, and may save the value in the storage medium 392. Also, the computer may capture a screenshot on the application, and may save the screenshot in the storage medium 392. In the following, the saved DOM tree and CSS will be referred to as the DOM tree and the CSS of the record section 1 (i=1).

In block 309, the computer extracts the timing information 2 from the input operation history 2 extracted in block 305.

In block 310, the computer extracts the input operation 2 from the input operation history 2 extracted in block 305, and emulates and performs the input operation 2 according to the timing information 2 extracted in block 309. The computer acquires, at the end of emulation of the input operation 2, a DOM tree at the time of the end (that is, of the timing information 2) and CSS to be applied to each DOM element in the tree.

In block 311, the computer saves each of the DOM tree and the CSS in the record section 2 (i=2), which were acquired in block 310, in the storage medium 392. The CSS to be saved may include, for each DOM element in the DOM tree, a CSS property to be applied to the DOM element and a definition location of the CSS property. Incidentally, when the CSS property to be applied to the DOM element in the DOM tree is undefined, the computer may acquire a value that is to be used as an initial value for each DOM element, and may save the value in the storage medium 392. Also, the computer may capture a screenshot on the application, and may save the screenshot in the storage medium 392. In the following, the saved DOM tree and CSS will be referred to as the DOM tree and the CSS of the record section 2 (i=2).

In block 312, the computer extracts the timing information n from the input operation history n extracted in block 305.

In block 313, the computer extracts the input operation n from the input operation history n extracted in block 305, and emulates and performs the input operation n according to the timing information n extracted in block 312. The computer acquires, at the end of emulation of the input operation n, a DOM tree at the time of the end (that is, of the timing information n) and CSS to be applied to each DOM element in the tree.

In block 314, the computer saves each of the DOM tree and the CSS in the record section n (i=n), which were acquired in block 313, in the storage medium 392. The CSS to be saved may include, for each DOM element in the DOM tree, a CSS property to be applied to the DOM element and a definition location of the CSS property. Incidentally, when the CSS property to be applied to the DOM element in the DOM tree is undefined, the computer may acquire a value that is to be used as an initial value for each DOM element, and may save the value in the storage medium 392. Also, the computer may capture a screenshot on the application, and may save the screenshot in the storage medium 392. In the following, the saved DOM tree and CSS will be referred to as the DOM tree and the CSS of the record section n (i=n).

In block 315, the computer compares, with respect to the same record section (i=i'), the DOM tree and the CSS that were saved in each of blocks 204, 208, 212 and 216 shown in FIG. 2 ("saved DOM tree and CSS" shown in block 315 in FIG. 3) and the DOM tree and the CSS that were saved in each of blocks 304, 308, 311 and 314 shown in FIG. 3 ("acquired DOM tree and CSS" shown in block 315 in FIG. 3). The details of the comparison contents and output of the result of the comparison will be described with reference to FIGS. 4A and 4B described below.

In block 315, the computer may, particularly, compare each DOM element in the DOM tree with each corresponding DOM element in the corresponding DOM tree. Also, the computer may, particularly, compare each value of each CSS property in the CSS with each value of each corresponding CSS property in the corresponding CSS. Furthermore, the computer may also take, as a comparison target, CSS that has been inherited from the parent element, for example.

Additionally, in the flow chart shown in FIG. 3, the computer collectively performs the comparison operation in block 315 after completion of block 313 where the input operation that is emulated is the last. Instead of collectively performing the comparison operation in block 315 after block 313, the computer may perform the comparison operation after block 304, after block 308, after block 311, and after block 314, that is, every time the DOM tree and the CSS are saved. Alternatively, the computer may perform the comparison operation in block 315 based on input of an output command from the user for outputting the result of comparison.

In block 316, the computer ends the method of saving the DOM trees and CSSs while emulating the input operations performed in FIG. 2 in the operation order, and detecting an influence that is caused by changing the source code of the application.

The user may repeatedly perform each operation shown in FIG. 3 every time the source code is changed.

Figure 4A:
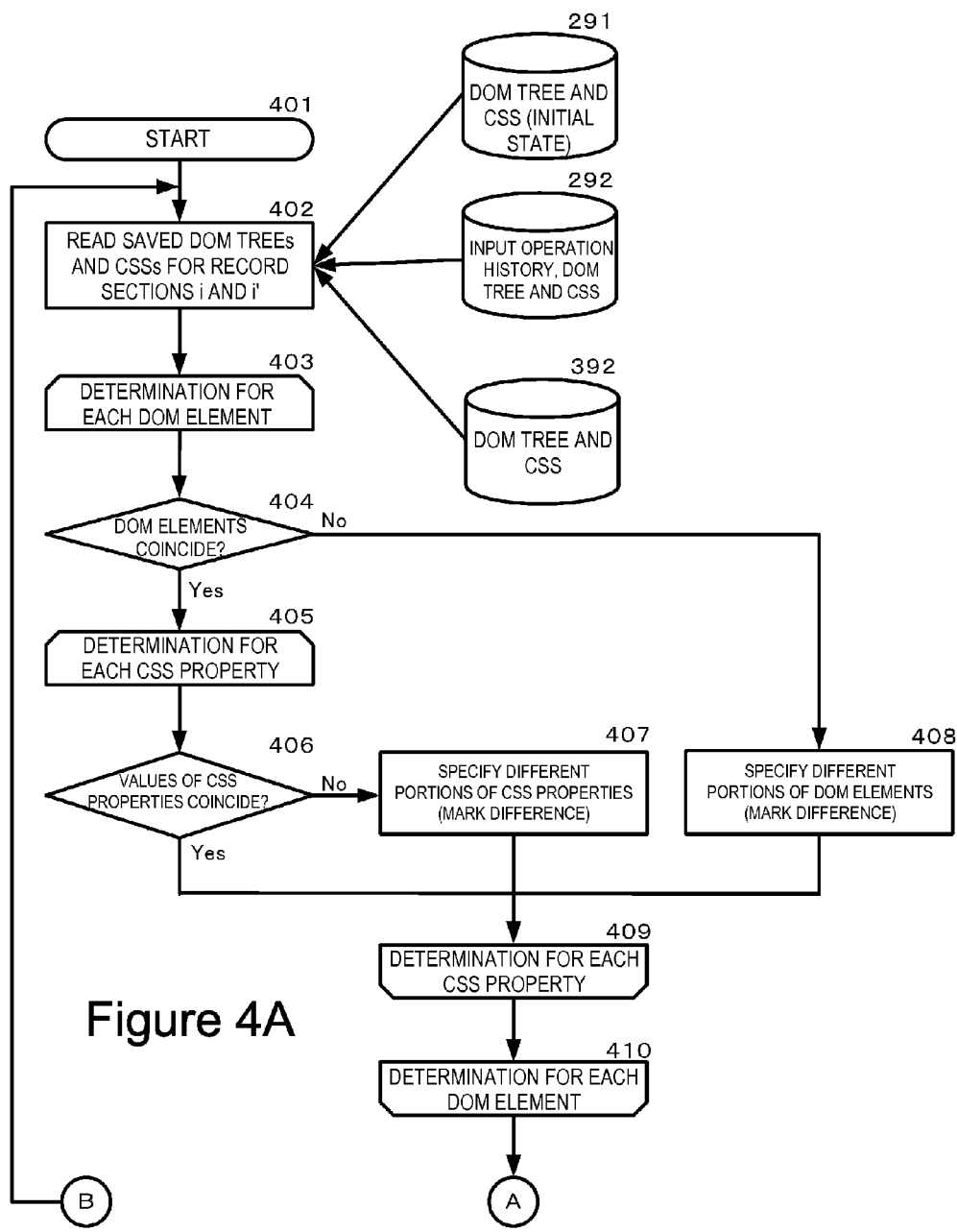
FIG. 4A is a flow chart, according to the embodiment of this disclosure, of a method of comparing each DOM element in a DOM tree and the value of a CSS property which have already been saved with each DOM element in the DOM tree and the value of the CSS property that were acquired, and outputting the result of the comparison, among the blocks of the flow chart shown in FIG. 3.
Figure 4B:
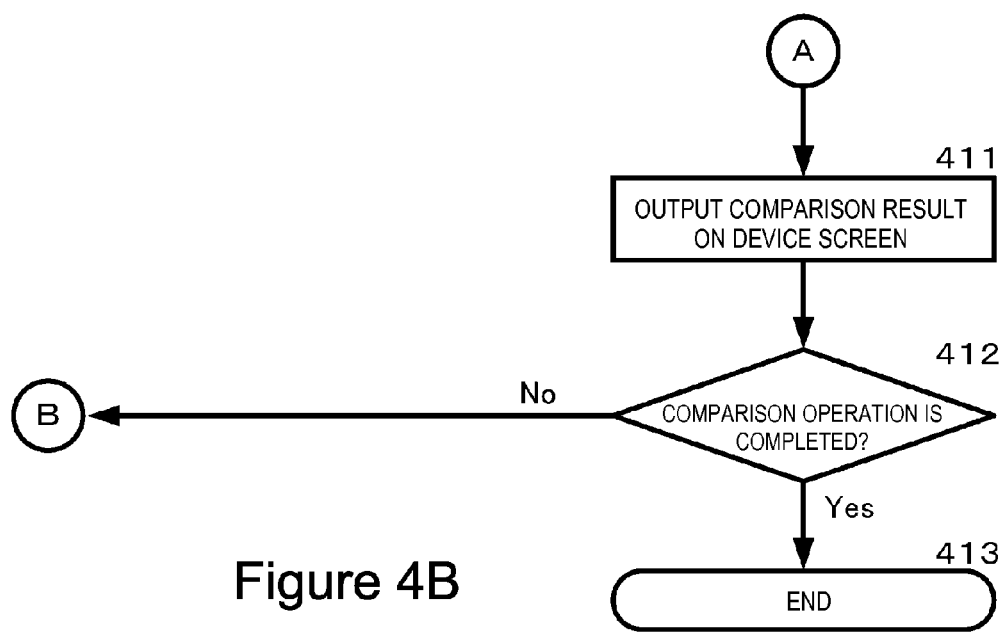
FIG. 4B is a flow chart, according to the embodiment of this disclosure, of a method of comparing each DOM element in a DOM tree and the value of a CSS property which have already been saved with each DOM element in the DOM tree and the value of the CSS property that were acquired, and outputting the result of the comparison, among the blocks of the flow chart shown in FIG. 3.

FIGS. 4A and 4B illustrate flow charts, according to the embodiment of this disclosure, of a method, which is performed in block 315 shown in FIG. 3, of comparing, first, each DOM element in a DOM tree and the value of a CSS property that were already saved with, second, each DOM element in the DOM tree and the value of the CSS property that were acquired, and also outputting the result of the comparison.

The computer that is the execution body of each block shown in FIGS. 4A and 4B is the same as the computer that is the execution body of each block shown in FIG. 3.

In block 401, the computer starts the operation of comparing and outputting the result of the comparison.

In block 402, the computer reads the DOM tree and the CSS for the record section i indicated by the user from the storage medium 291, 292 in which the DOM tree and the CSS have been saved. Also, the computer reads the DOM tree and the CSS for the record section i' which is the same record section as the record section i (that is, i=i') from the storage medium 392 in which the acquired DOM tree and CSS have been saved.

In block 403, the computer starts to repeatedly perform the operations indicated by blocks 404 to 409 on each DOM element in the DOM tree that is the determination target.

In block 404, the computer determines, with respect to each DOM element in the DOM tree that is the determination target, whether the DOM elements in the same record sections (i=i') coincide with each other. The computer proceeds to block 405 if the DOM elements coincide with each other. On the other hand, the computer proceeds to block 408 if the combination of elements does not coincide.

Additionally, in block 404, if an exclusion variable for ignoring comparison of specific DOM elements in the DOM tree is set, the computer may ignore the comparison of the DOM elements. The exclusion variable may stand for an instruction not to compare DOM elements existing under a specified tag in the DOM tree, or not to compare portions that are not noticed as different portions on the graphical user interface of the application. For example, the user may set an exclusion variable for a portion with respect to which an influence to be caused by addition of a function or change in the source code may be predicted in advance (for example, a DOM element, a specified location, or a line number). For example, the user may set an exclusion variable such that any DOM element under a DOM element whose addition to the source code is known (for example, <div id="newFeature">) is ignored. The computer may be provided with a user interface (for example, a window menu) for receiving input of a value for the exclusion variable.

In block 405, the computer starts to repeatedly perform the operations indicated by blocks 406 and 407 on each CSS property which is the determination target.

In block 406, the computer determines whether the values of CSS properties that are the determination targets coincide with each other in the same record sections (i=i'). That is, the computer may compare the value that is used in the default of the browser (i.e., the value that is used as the initial value), where the value of each CSS property of the record section i is not defined or where the CSS property is not defined in the CSS file, with the value that is used in the default of the browser (i.e., the value that is used as the initial value), where the value of each corresponding CSS property of the corresponding record section i' is not defined or where the CSS property is not defined in the CSS file. Specifically, the computer may specify, among the CSS properties of the record section i, a first CSS property (for example, font-size) that is used for actual screen display in the record section i, and specify, among the CSS properties of the record section i', a second CSS property (for example, font-size) that is used for actual screen display in the record section i' and that is of the same type as the first CSS property, and may perform comparison to determine wither a first value, being the value of the first CSS property or, in the case the first CSS property is not defined in the CSS file, the value that is used in the default of the browser (i.e., the value that is used as the initial value), and a second value, being the value of the second CSS property or, in the case the second CSS property is not defined in the CSS file, the value that is used in the default of the browser (i.e., the value that is used as the initial value), are the same value (for example, 12px). Additionally, where corresponding CSS properties of both CSS files are undefined, the computer uses, for both cases, the value that is used in the default of the browser. Accordingly, the values that are used in the default in both cases coincide, and the computer determines that there is no different portion. In this manner, the computer proceeds to block 409 in response to coincidence between the values of the CSS properties. On the other hand, in the case the values of the CSS properties do not coincide, the computer proceeds to block 407.

In block 407, since the values of the CSS properties do not coincide, the computer specifies the different portions (i.e., the difference) of the CSS properties, that is, values of the CSS properties that are different. The computer may mark the different portions such that they are displayed in a highlighted manner when output in block 411.

In block 408, since the DOM elements do not coincide in the same record sections (i=i'), the computer specifies the different portions in the DOM elements in the DOM tree. The computer may mark the different portions such that they are displayed in a highlighted manner when output in block 411.

In block 409, if the operations indicated by blocks 406 and 407 are not completed for all the CSS properties the computer repeats the operations indicated by blocks 406 and 407. If the operations indicated by blocks 406 and 407 are completed for all the CSS properties, the computer proceeds to block 410.

In block 410, if the operations indicated by blocks 404 to 409 are not completed for all the DOM elements in all the DOM trees, the computer repeats the operations indicated by blocks 404 to 409. If the operations indicated by blocks 404 to 409 are completed for all the DOM elements in all the DOM trees, the computer proceeds to block 411.

In block 411, the computer may display the different portions specified in blocks 407 and 408 for each of the same record sections (i=i').

The different portions are displayed in the following manner, for example: the computer may mark, in a highlighted manner, the different portions that were specified in block 408 in windows displaying the DOM elements in the DOM trees of the same record sections (i=i') (for example, see DOM trees 621 and 661 shown in FIGS. 6A to 6C, and DOM trees 721 and 761 shown in FIGS. 7A to 7C); and/or the computer may mark, in a highlighted manner, the different portions that were specified in block 407 in screen displays displaying the CSS applied for each DOM element of the same record sections (i=i'). For example, the windows shown in FIG. 6C display the CSSs 631 and 671, and the windows shown in FIGS. 7A to 7C display the CSSs 731 and 771.

In block 411, the computer may display the contents that the application displays in the windows (for example, web browser) of the same record sections (i=i'). For example, the computer may display the screenshot captured in each of blocks 204, 208, 212, and 216 shown in FIG. 2 and the screenshot captured in each of blocks 304, 308, 311, and 314 shown in FIG. 3 in the windows for the same record sections (i=i').

Furthermore, in block 411, the computer may specify the different portions of the screen displays (for example, windows) of the application for the same record sections (i=i'). The computer may specify the different portions which have been specified as the different portions of the same record sections (i=i'), that is, the different portion between the graphical user interfaces on the application.

In block 411, the computer may display the difference in the invisible region, which is not shown, as the different portion between the graphical user interfaces on the application. The difference in the invisible region may be specified by the DOM element in the DOM tree and/or the CSS property or the value of the CSS property.

The difference in the invisible region may be specified by the CSS property or the value of the CSS property. A case where the difference in the invisible region is based on the CSS property is a case where the CSS property exists in only one of the CSS files and there is no initial value for the browser, for example. A case where the difference in the invisible region is based on the value of the CSS property is a case where the CSS property exists in only one of the CSS files, and there are initial values for the browser and the values are different, or where the same CSS property exists in both of the CSS files, and the values of the two are different.

In block 411, the computer may display, for each of the same record sections (i=i'), a CSS file and a position (for example, the line number) of the CSS file where the different portion between the graphical user interfaces on the application is defined. Particularly, the computer may display, in a highlighted manner, a CSS property, among the CSS properties of the record section i, that corresponds to the first CSS property defining the value that is used for the actual screen display at one specific time and that defines a value that is not used for the actual screen display. The computer may also display, in the same manner, in a highlighted manner, a CSS property, among the CSS properties of the record section i', that corresponds to the second CSS property defining the value that is used for the actual screen display at the same timing as the one specific time mentioned above and that defines a value that is not used for the actual screen display.

Also, in block 411, if the methods shown in FIGS. 4A and 4B are performed for a unit test, the computer may output a difference report for the unit test (for example, by screen output, file output, or print output).

In block 412, the computer determines whether the output operation of a comparison result is completed. If the comparison operation is completed, the computer proceeds to block 413 and ends the method. On the other hand, when continuing with the comparison operation, the computer returns the method to block 402. The comparison operation is continued if a different record section is selected by the user, for example.

In block 413, the computer ends the comparison and the method of outputting the result of the comparison.

Figure 5A:
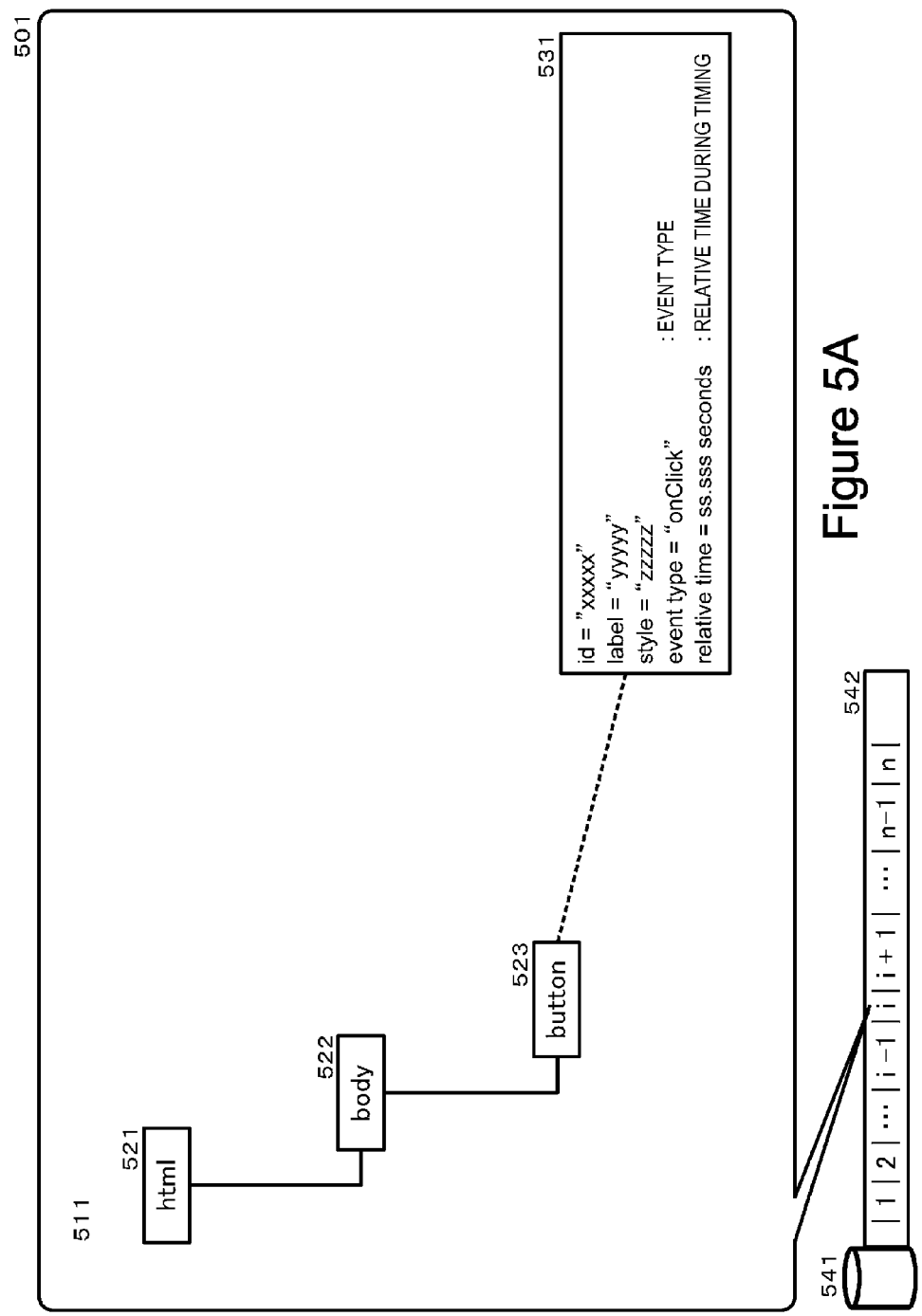
FIG. 5A illustrates a storage mode of an input operation history that is saved according to the embodiment of this disclosure.
Figure 5B:
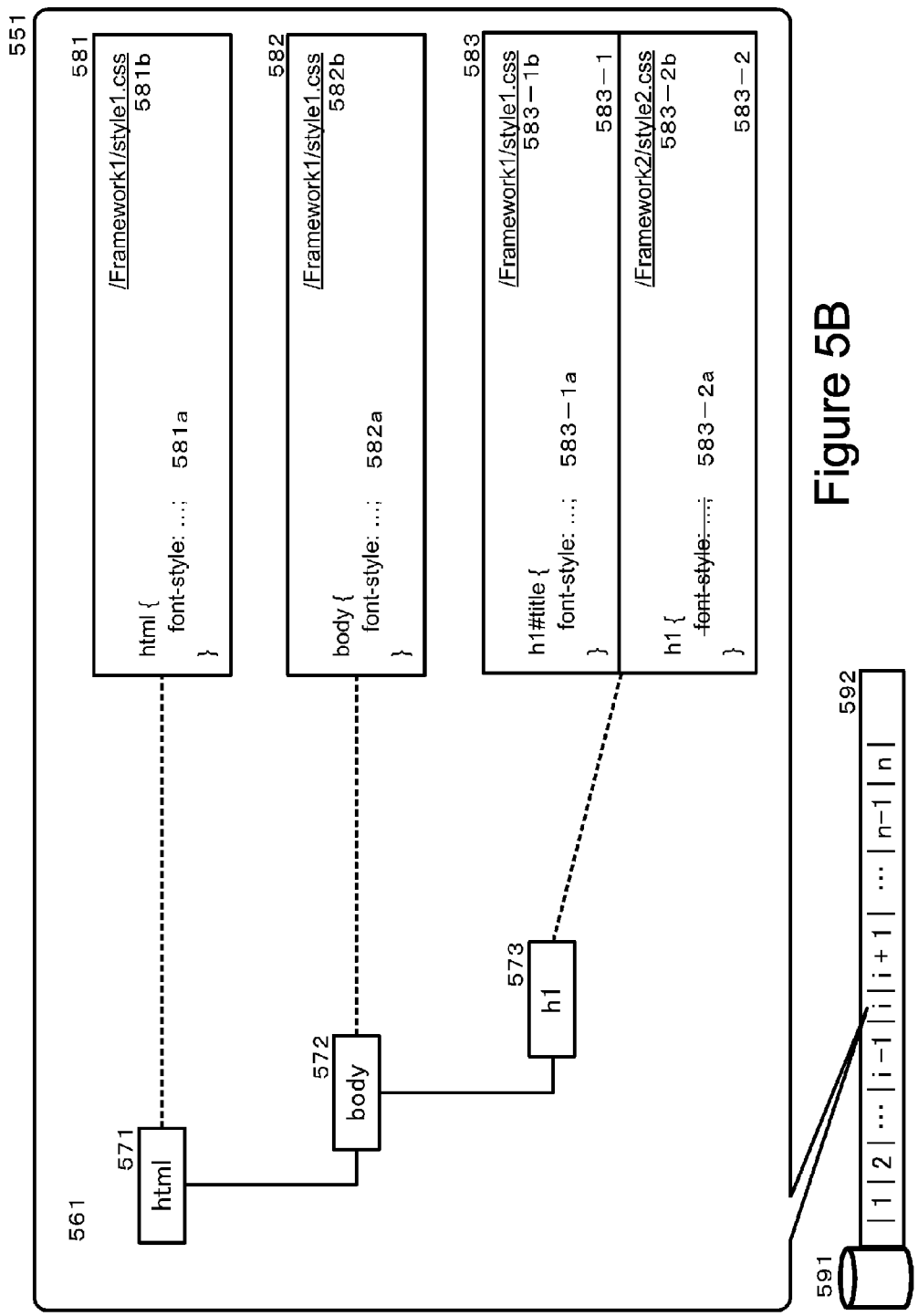
FIG. 5B illustrates a storage mode of a DOM tree to be saved according to the embodiment of this disclosure, and CSS (including a CSS property and a definition location of the CSS property) to be applied to each DOM element in the DOM tree.

FIG. 5A illustrates a storage mode of an input operation history that is saved according to the embodiment of this disclosure.

A screen 501 illustrates a mode of storage of input operation contents that are saved at a certain time (in record section i) when the screen state of the application is desired to be checked.

A DOM tree 511 illustrates a hierarchical structure of DOM elements 521, 522, and 523. The DOM element 521 is a root DOM element, and the DOM elements 522 and 523 are branch DOM elements.

To perform the emulation operations indicated by blocks 306 and 307, 309 and 310, and 312 and 313 shown in FIG. 3 with respect to the blocks 207, 211, and 215 of the flow chart shown in FIG. 2, all the information about the elements related to the input operation of the user has to be recorded. These pieces of information are, for example, an identification number (id), a label and/or a style, an event type (for example, "onClick"), and relative time for determining which event occurred after how many seconds since the start of the record section i and the order of the events (for example, "relative time in record section i: ss.sss seconds"). The identification number as well as the label and/or the style are for recording the target with respect to which the user has performed an input (for example, a button that was clicked, or a text box where a key input was performed). The style may be used to perform identification of "button appearing first with width: 100px; height: 40px" in a situation where the identification number or the label of a button is changed by input data. Also, an input operation history, such as various events performed by the user in the record section i (for example, clicking the button, double-clicking the button, drag and drop, mouse hover or other hover, key input), is associated with the DOM element 523. Accordingly, at the time of performing the emulation operations indicated by blocks 306 and 307, 309 and 310, and 312 and 313 shown in FIG. 3, the computer is enabled to specify the way a certain button is clicked, by using the operation history shown in FIG. 5A. At the time of performing the emulation operations indicated by blocks 306 and 307, 309 and 310, and 312 and 313 shown in FIG. 3, the computer may emulate clicking on an element of the same identification number if the identification numbers are the same, and if the identification number is dynamically changed, the computer may emulate clicking on a button with the same label, for example. However, depending on the JavaScript framework used, an id attribute may be automatically created. Accordingly, selection of the attribute value to be used for the specification (for example, selection by a label) is enabled. The computer may display a window for allowing the user to perform the selection.

A storage medium 541 stores input operation histories 0, 1, 2, . . . , n in each record section i at the times 542 shown in FIG. 2 (blocks 207, 211, and 215).

FIG. 5B illustrates a storage mode of a DOM tree to be saved according to the embodiment of this disclosure, along with one or more CSSs (including a CSS property and a definition location of the CSS property) to be applied to each DOM element in the DOM tree.

A screen 551 shows a DOM tree 561 and DOM elements 571, 572, and 573 in the DOM tree 561 at a certain time (in record section i) when the screen state of the application is desired to be checked, along with CSSs 581, 582, and 583 that are applied to the DOM elements 571, 572, and 573.

A DOM tree 561 shows a hierarchical structure of the DOM elements 571, 572, and 573. The DOM element 571 is a root DOM element, and the DOM elements 572 and 573 are branch DOM elements.

The CSS 581 indicates that the DOM element 571 is associated with the CSS 581. The CSS 581 includes a CSS property 581*a* that is applied to the DOM element 571. The definition location of the CSS 581 is indicated by a file named "/Framework1/style1.css" 581*b* in the CSS 581.

The CSS 582 indicates that the DOM element 572 is associated with the CSS 582. The CSS 582 includes a CSS property 582*a* that is applied to the DOM element 572. The definition location of the CSS 582 is indicated by "/Framework1/style1.css" 582*b* in the CSS 582.

The CSS 583 indicates that the DOM element 573 is associated with the CSS 583. The CSS 583 includes CSS 583-1 and CSS 583-2 at different definition locations. The CSS 583-1 includes a CSS property 583-1*a* that is applied to the DOM element 573. The CSS 583-2 includes a CSS property 583-2*a* that is applied to the DOM element 573. The CSS property 583-2*a* is defined in the CSS 583-2, but since the CSS property 583-1*a* in the CSS 583-1 of the framework is more prioritized than the CSS property 583-2*a*, a strikethrough is drawn on the CSS property 583-2*a* to indicate that it is not applied to the DOM element.

A storage medium 591 stores a set of a DOM tree, which is saved in each of the record sections i at the times (blocks 203, 206, 210, and 214) shown in FIG. 2, and one or more CSSs to be applied to each DOM element in the DOM tree (blocks 204, 208, 212, and 216) 592. In the same manner, the storage medium 591 stores, in FIG. 3, a set of a DOM tree, which is saved in each record section i at a time shown in FIG. 2, and one or more CSSs to be applied to each DOM element in the DOM tree (blocks 304, 308, 311, and 314) 591.

FIGS. 6A to 6C, 7A to 7C, and 8A to 8C each illustrate, according to the embodiment of this disclosure, detection of an influence that is caused by changing the source code of an application (a part of a control panel application) from which a DOM tree and CSS may be extracted, and an example output of the result of the detection.

FIGS. 6A to 6C illustrate an output screen 601 for the result of the detection. The output screen 601 shows, on the left side of the output screen 601, a preview screen display window 611 of the application of a record section 5 (i=5) of execution record 1 (2013/10/01 10:00:00), which is the (initial) execution time of the method shown in FIG. 2, a window 621 for displaying the DOM tree of the record section 5 (i=5), and a window 631 for displaying one or more CSSs applied to each DOM element in the DOM tree. The output screen 601 further shows, on the right side of the output screen 601, a preview screen display window 651 of the application of a record section 5 (i'=5) of execution record 3 (2013/10/20 16:30:00), obtained after performing the method shown in FIG. 3 two times in addition to the execution of the method shown in FIG. 2, a window 661 for displaying the DOM tree of the record section 5 (i'=5), and a window 671 for displaying one or more CSSs applied to each DOM element in the DOM tree.

The output screen 601 shows, on the upper left side of the output screen 601, the preview screen display window 611 of the application of the initial execution record 1 (2013/10/01 10:00:00), which is the execution time of the method shown in FIG. 2, and a scroll bar 691 in the preview screen display window 611, for enabling selection of display of a x+1-th preview screen of the application obtained after performing the method shown in FIG. 3 x times in addition to the initial execution of the method shown in FIG. 2. By operating the scroll bar 691 (for example, by selecting a Prev button or a return to previous button to go back, or a Next button or a proceed button to go forward), the user may display, in the preview screen display window 611, a preview screen for an execution record that is older or newer than the execution record currently being displayed.

In the same manner, the output screen 601 shows, on the upper right side of the output screen 601, the preview screen display window 651 of the application of execution record 3 (2013/10/20 16:30:00), obtained after performing the method shown in FIG. 3 two times in addition to the initial execution of the method shown in FIG. 2, and a scroll bar 692 in the preview screen display window 651, for enabling selection of display of a x+1-th preview screen of the application obtained after performing the method shown in FIG. 3 x times in addition to the initial execution of the method shown in FIG. 2. By operating the scroll bar 692 (for example, by selecting a Prev button or a return button to go back, or a Next button or a proceed button to go forward), the user may display, in the preview screen display window 651, a preview screen for an execution record that is older or newer than the execution record that is currently being displayed.

On the output screen 601, the preview screen display window 611 on the upper left side may be made into the display screen of the application that is temporarily previous to the preview screen display window 651 on the upper right side.

Furthermore, the output screen 601 includes a scroll bar 693 enabling selection regarding the preview screen of which record section (e.g., the record section i or the record section i', i=i') is to be displayed in the preview screen display window 611 on the upper left side and the preview screen display window 651 on the upper right side. By operating the scroll bar 693 (for example, by selecting a Prev button or a return button to go back, or a Next button or a proceed button to go forward), the user may display, in the preview screen display window 611 on the upper left side or the preview screen display window 651 on the upper right side, a preview screen for a specific record section (e.g., a record section i for i=0 to n, or a record section i' for i'=0 to n).

Figure 7A:
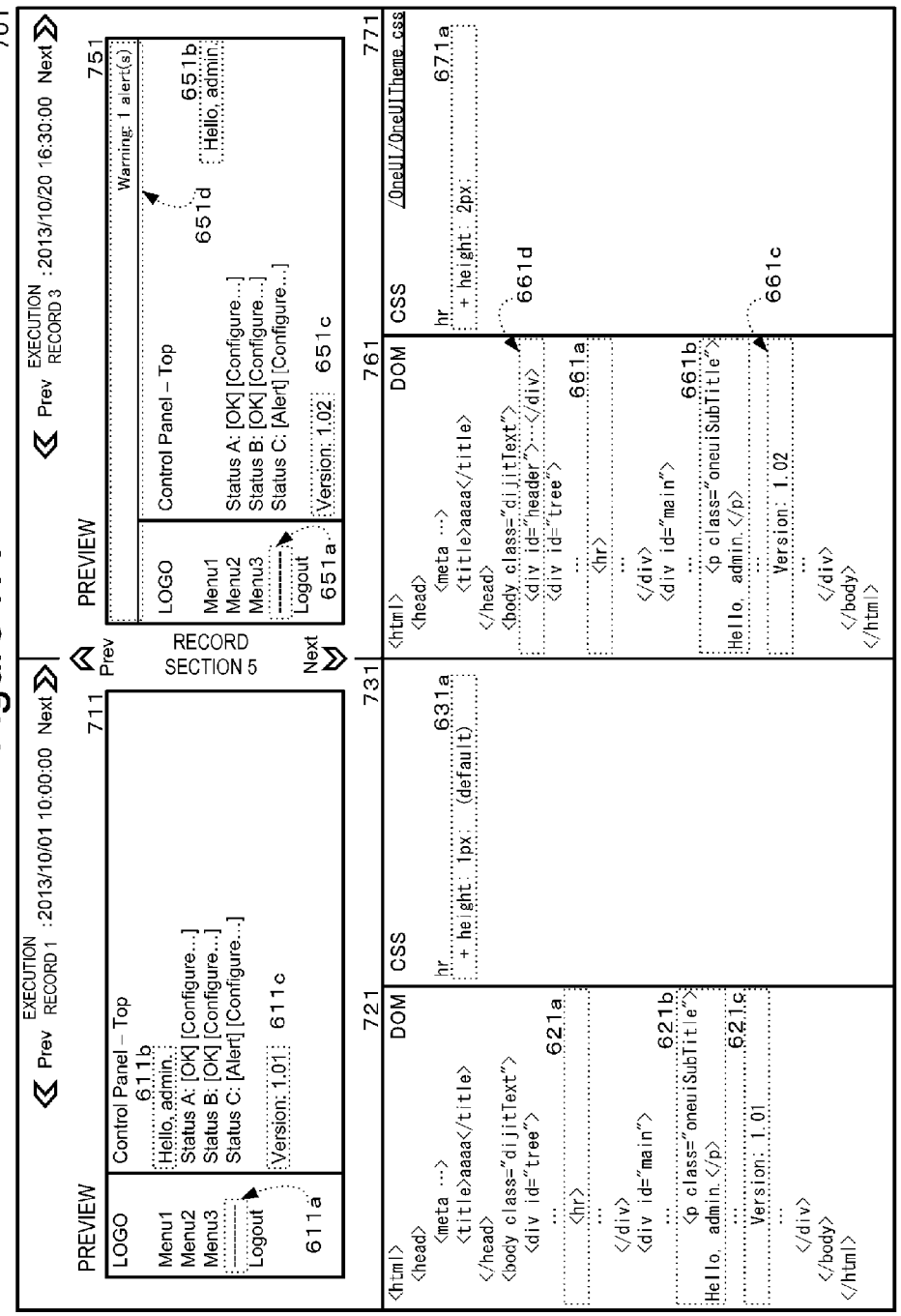
FIG. 7A illustrates, according to the embodiment of this disclosure, detection of an influence that is caused by the change in source code, and an example output of the result of the detection.
Figure 7B:
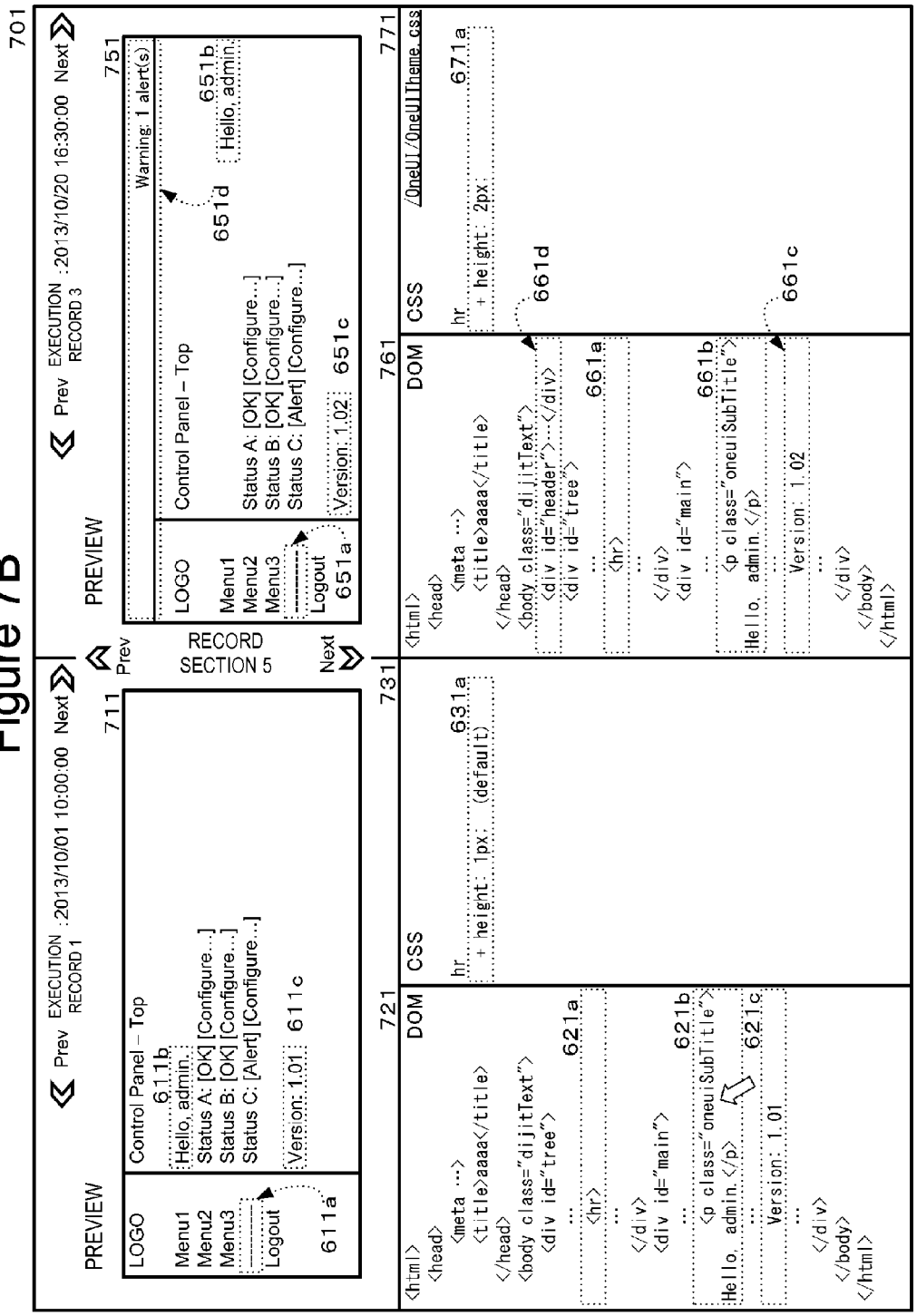
FIG. 7B illustrates, according to the embodiment of this disclosure, detection of an influence that is caused by the change in source code, and an example output of the result of the detection.
Figure 7C:
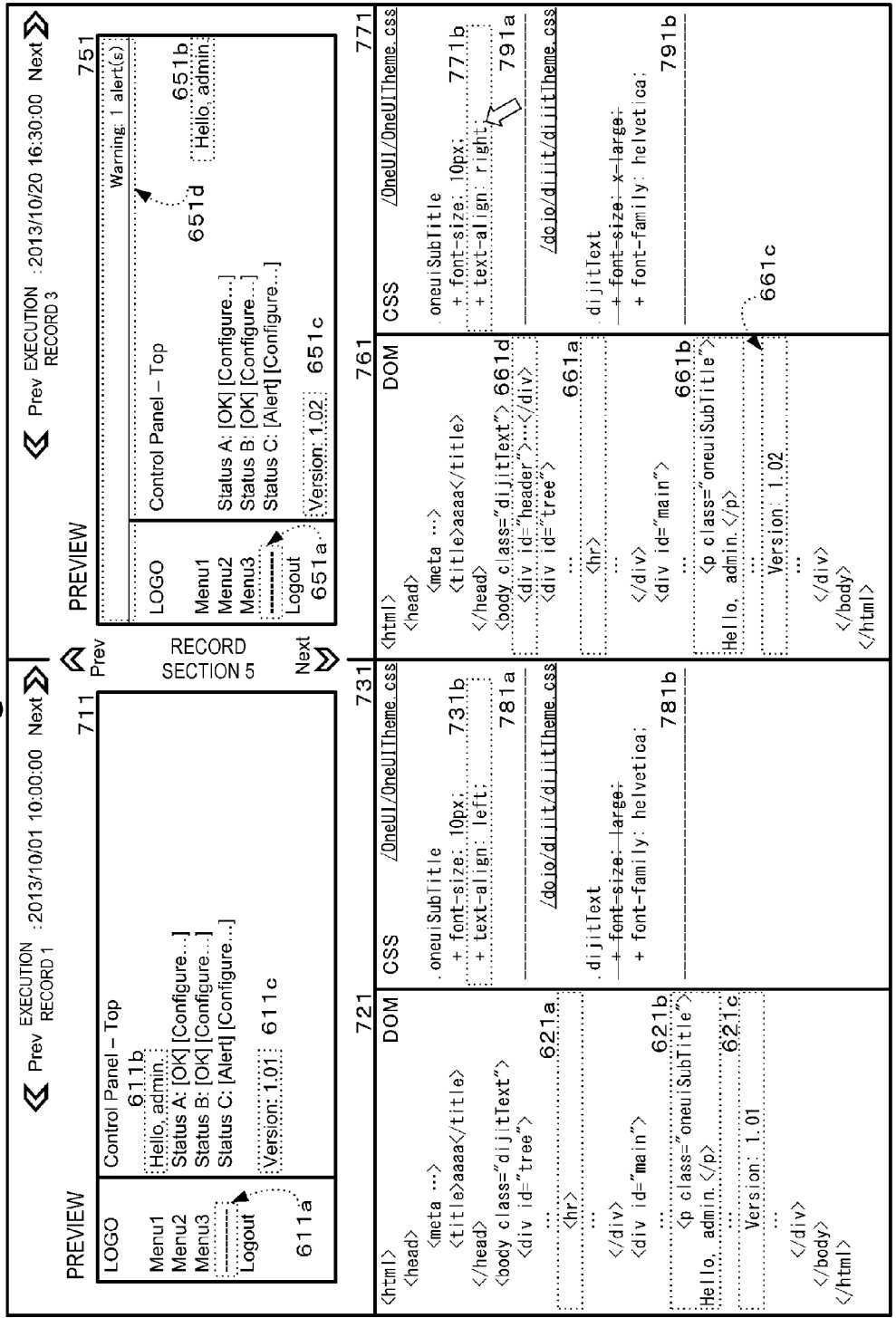
FIG. 7C illustrates, according to the embodiment of this disclosure, detection of an influence that is caused by the change in source code, and an example output of the result of the detection.
Figure 8A:
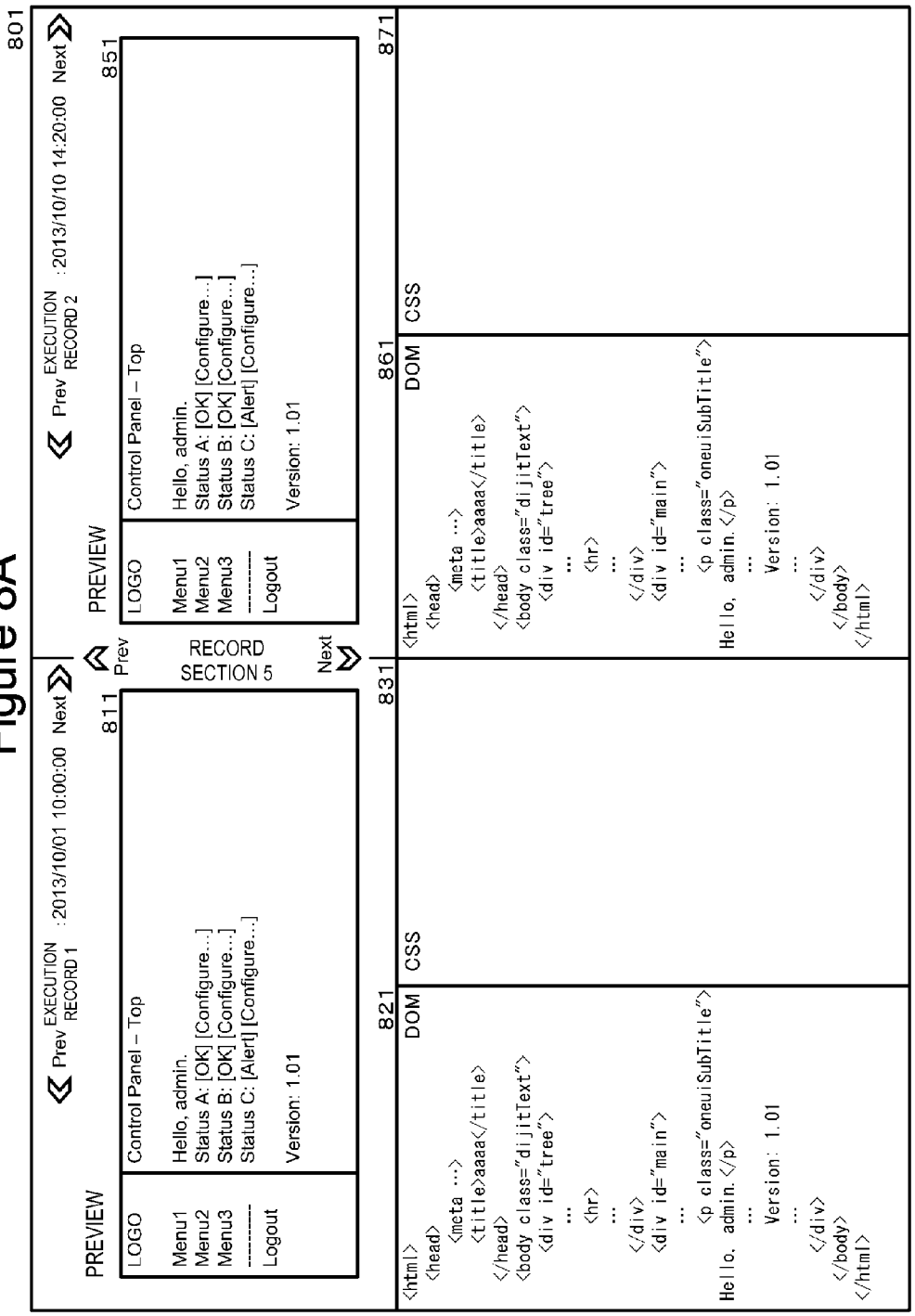
FIG. 8A illustrates, according to the embodiment of this disclosure, detection of an influence that is caused by the change in source code, and an example output of the result of the detection.
Figure 8B:
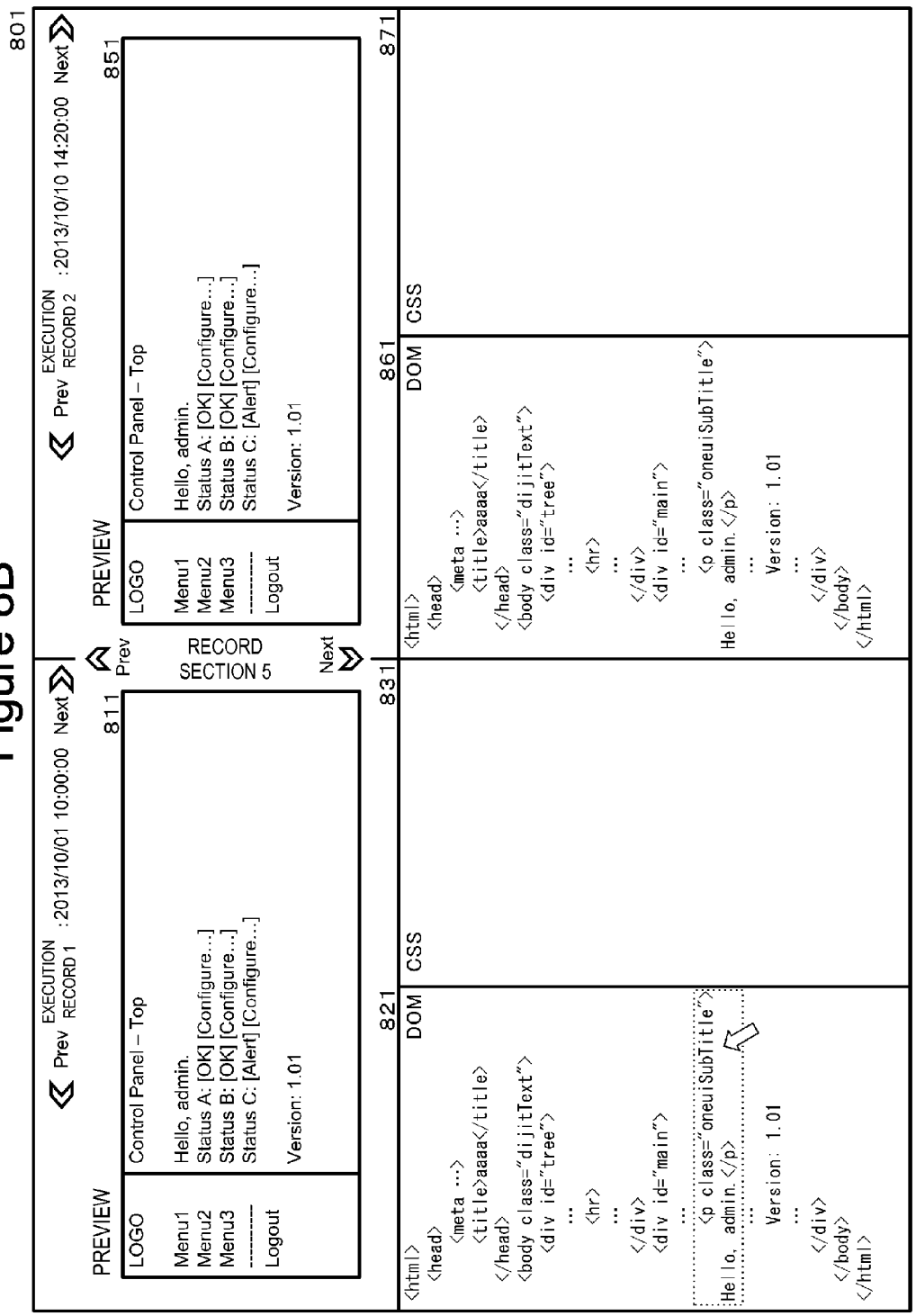
FIG. 8B illustrates, according to the embodiment of this disclosure, detection of an influence that is caused by the change in source code, and an example output of the result of the detection.

The description about the output screen 601 is applied to an output screen 701 shown in FIGS. 7A to 7C, and an output screen 801 shown in FIGS. 8A to 8C in the same manner.

In FIG. 6A, the preview screen display window 611 shows a preview screen for the record section 5 (i=5) of the initial execution record (2013/10/01 10:00:00), which is the execution record 1. The preview screen display window 651 shows a preview screen for the record section 5 (i'=5) of the third execution record (2013/10/20 16:30:00), which is the execution record 3.

The display is different between the preview screen display window 611 and the preview screen display window 651 in the following manner:

Text decoration (height: 1px (611a), height 2px (651a))

Display position of "Hello, admin." (left alignment (611b), right alignment (651b))

"Version" number (1.01 (611c), 1.02 (651c))

Presence/absence of alert display ("Warning: 1 alert(s)" (651d)): "Warning: 1 alert(s)" is a header portion added to the control panel application, in contrast to the preview screen display window 611. This header portion "Warning: 1 alert(s)" is, in the example shown in FIG. 6A, a display of an alert with respect to Status C in the control panel application.

In the preview screen display window 611, frame portion 611c shows a difference caused by changing the DOM, and frame portions 611a, 611b show differences caused by changing the CSS. In the preview screen display window 651, frame portions 651c, 651d show differences caused by changing the DOM, and frame portions 651a, 651b show differences caused by changing the CSS.

The portions that are displayed differently between the preview screen display window 611 and the preview screen display window 651 (that is, the comparison result of the display windows) are displayed in a highlighted manner. The portions that are displayed differently are the portions influenced by a change in the source code. If the different portions are text, highlighting may be performed by framing the text, decorating the text (for example, bold, italic, underlined, or colored), or separating the row or column of the text by bordering, for example. If the different portions are images, highlighting may be performed by framing the images, or separating the row or column of the images by bordering.

In FIG. 6A, the window 621 displaying a DOM tree displays a DOM element tree including a DOM element that influences the comparison result in the preview screen display window 611. For example, frame portions 621a, 621b, and 621c correspond to DOM elements influencing different portions 611a, 611b, and 611c displayed in the preview screen display window 611. The frame portions 621a, 621b, and 621c may be displayed in a highlighted manner with the colors of the background of portions surrounded by the frame portions being different.

In FIG. 6A, the window 661 displaying a DOM tree displays a DOM element tree including a DOM element that influences the comparison result in the preview screen display window 651. For example, frame portions 661a,

661*b*, 661*c*, and 661*d* correspond to DOM elements influencing different portions 651*a*, 651*b*, 651*c*, and 651*d* displayed in the preview screen display window 651.

In FIG. 6A, nothing is yet displayed in the windows 631 and 671 for displaying the CSSs.

It is assumed, as shown in FIG. 6B, that the user has clicked on the frame portion 621*a* in the window 621 for displaying the DOM tree (i.e., a <hr> tag, which is the DOM element 621*a* displayed in a highlighted manner), by a pointing device and selected the same, for example. As described above, the frame portion 621*a* corresponds to the DOM element influencing the different portion 611*a* displayed in the preview screen display window 611. In response to the clicking on the frame portion 621*a*, the computer displays, in a highlighted manner, in the window 621 for displaying the DOM tree, the DOM element 621*a* that is the target of the clicking or a peripheral portion including the DOM element 621*a*. For example, the computer changes the color of the background of the <hr> tag, which is the DOM element 621*a*, or changes the font of the <hr> tag. Moreover, the computer displays, in each of the preview screen display window 611 and the preview screen display window 651, the frame portion 611*a* and the frame portion 651*a* in a highlighted manner, in response to the clicking on the frame portion 621*a*. For example, the computer changes the color of the background or changes the font.

As shown in FIG. 6C, in response to the selection of the DOM element 621*a*, the computer detects the difference between the CSSs applied to the DOM element 621*a* and the DOM element 661*a* corresponding to the DOM element 621*a*, and displays the differences detected 631*a*, 671*a* in the windows 631, 671 for displaying the CSS. The difference between the CSSs is the frame 631*a* in the window 631 for displaying the CSS, and the frame 671*a* in the window 671 for displaying the CSS. The "+height: 1px; (default)" displayed by the frame 631*a* in the window 631 is supplemented by a value that is used in the default of the browser, and is not based on the contents described in the CSS file, in some embodiments. That is, this does not simply display the contents described in the CSS file. Accordingly, the computer compares the "+height: 1px; (default)" in the window 631 for displaying the CSS, which is not based on the contents described in the CSS file, and the "+height: 2px;" in the window 631 for displaying CSS, which is the contents described in the CSS file, and obtains the difference. The computer may display the difference in a highlighted manner. The mode of highlighted display is the same as the mode described above.

In the example shown in FIG. 6C, it is indicated that the height of <hr>, which is difficult for the user to visually check simply by viewing the preview screen display window 611 and the preview screen display window 651, is changed. Although the names of the CSS properties with respect to the detected differences 631*a*, 671*a* are the same with both being "height", the value defined by the CSS property of one of the differences 631*a* (in reality, the default is described, and the value is the value supplemented by a value that is used in the default of the browser as described below) is "1px", and the value defined by the CSS property of the other of the differences 671*a* is "2px". Thus, the defined value is different between one of the differences 631*a* and the other of the differences 671*a*.

In the window 631 for displaying the CSS, height, which is the CSS property of <hr>, is undefined in the CSS file. Accordingly, the computer displays by using 1px, which is the initial value of the application (for example, web application) for displaying the preview screen. This initial value may be different for each web application. Accordingly, in the window 631 for displaying the CSS, the default is described to supplement what the initial value for comparison with a value defined by the CSS property is.

It is assumed, as shown in FIG. 6C, that the user has clicked on the difference 671*a* in the CSS property by a pointing device and selected the same, for example. The computer may jump to the row where the file is defined, in response to the selection of the difference 671*a* in the CSS property.

The output screen 701 shown in FIG. 7A is a screen that is displayed in response to the selection of the DOM element 621*a* shown in FIG. 6B. Accordingly, the output screen 701 shown in FIG. 7A is the same as the output screen 601 shown in FIG. 6C.

It is assumed, as shown in FIG. 7B, that the user has clicked on the frame portion 621*b* in the window 721 for displaying the DOM tree (i.e., the DOM element 621*b* displayed in a highlighted manner) by a pointing device and selected the same, for example. As described above, the frame portion 621*b* corresponds to the DOM element influencing the different portion 611*b* that is displayed in the preview screen display window 711. In response to the clicking on the frame portion 621*b*, the computer displays, in a highlighted manner, in the window 721 for displaying the DOM tree, the DOM element 621*b* that is the target of the clicking or a peripheral portion including the DOM element 621*b*. For example, the computer changes the color of the background of <p class="oneuiSubTitle">Hello,admin.</p>, or changes the font of the <p> tag. Moreover, the computer displays, in each of the preview screen display window 711 and the preview screen display window 751, the frame portion 611*b* and the frame portion 651*b* in a highlighted manner, according to the clicking on the frame portion 621*b*. For example, the computer changes the color of the background of "Hello, admin." 611*b*, 651*b*, or changes the font of "Hello, admin" 611*b*, 651*b*. Additionally, there is no difference between the DOM element in the frame portion 621*b* in the window 721 for displaying the DOM tree and the DOM element in the frame portion 661*b* in the window 761 for displaying the DOM tree.

As shown in FIG. 7C, in response to the selection of the DOM element 621*b*, the computer detects the difference between the CSSs applied to the DOM element 621*b* and the DOM element 661*b* corresponding to the DOM element 621*b*, and displays the differences detected 731*b*, 771*b* in the windows 731, 771 for displaying the CSS. The difference between the CSSs is the frame 731*b* in the window 731 for displaying the CSS, and the frame 771*b* in the window 771 for displaying the CSS. The computer may display the difference in a highlighted manner. In some embodiments, the mode of highlighted display is the same as the mode described above.

In the window 731 for displaying the CSS shown in FIG. 7C, with respect to a plurality of CSSs 781*a*, 781*b* to be applied to the DOM element 621*b*, the CSS properties are arranged from an element with a narrower range and with a higher priority. Also, if the same CSS property is defined for the same DOM element 621*b*, for example, a strikethrough is drawn on CSS properties other than the CSS property to be applied see 781*b*.

The window 731 for displaying the CSS shown in FIG. 7C displays together the definition location "/OneUI/OneUITheme.css" of the CSS 781*a*. Also, in the same manner, the window 731 for displaying the CSS displays together the definition location "/dojo/dijit/dijitTheme.css" of the plurality of CSSs 781b.

In the same manner, in the window 771 for displaying the CSS, with respect to a plurality of CSSs 791a, 791b to be applied to the DOM element 661b, the CSS properties are arranged from an element with a narrower range and with a higher priority. Also, if the same CSS property is defined for the same DOM element 661b, for example, a strikethrough is drawn on CSS properties other than the CSS property to be applied see 791b. In the window 771 for displaying the CSS, the definition locations of the plurality of CSSs 791a, 791b, "/OneUI/OneUITheme.css" and "/dojo/dijit/dijitTheme.css", are also displayed.

In the example shown in FIG. 7C, the CSS property "text-align" of the class "oneuiSubTitle" applied to the DOM element <p> is shown in the windows 731, 771 for displaying the CSS as the differences 731b, 771b. With respect to the detected differences 731b, 771b, the value defined by the CSS property for one of the differences 731b is "left", and the value defined by the CSS property of the other of the differences 771b is "right". Thus, the defined value is different for one of the differences 731b and the other of the differences 771b.

Also, the font-size of the class "dijitText" applied to the DOM element <body> is different at a file level. That is, it is "font-size: large;" for the class "dijitText" (see 781b), and "font-size: x-large;" for the class "dijitText" (see 791b). However, due to the priority regarding the CSS property, the values 781a, 791a of the font-size of the class "oneuiSubTitle" are used for the display instead of the values (see 781b and 791b) of the font-size of the class "dijitText". Accordingly, it is determined that the values (see 781b and 791b) of the font-size of the class "dijitText" do not influence the result of display on the preview screen display window 711 and the preview screen display window 751, and the values are not displayed in a highlighted manner.

It is assumed, as shown in FIG. 7C, that the user has clicked on the difference 771b in the CSS property with a pointing device and selected the same, for example. The computer may jump to the row where the file is defined, in response to the selection of the difference 771b in the CSS property.

FIGS. 8A to 8C illustrate, according to the embodiment of this disclosure, detection of an influence that is caused by the change mentioned above, and an example output of the result of the detection.

FIGS. 8A to 8C illustrate an output screen 801 for the result of the detection. The output screen 801 shows, on the left side of the output screen 801, a preview screen display window 811 of the application of a record section 5 (i=5) of execution record 1 (2013/10/01 10:00:00), which is the initial execution time of the method shown in FIG. 2, a window 821 for displaying the DOM tree of the record section 5 (i=5), and a window 831 for displaying one or more CSSs applied to each DOM element in the DOM tree. The output screen 801 also shows, on the right side of the output screen 801, a preview screen display window 851 of the application of a record section 5 (i'=5) of the execution record 2 (2013/10/10 14:20:00), obtained after performing the method shown in FIG. 3 once in addition to the execution of the method shown in FIG. 2, a window 861 for displaying the DOM tree of the record section 5 (i'=5), and a window 871 for displaying one or more CSSs applied to each DOM element in the DOM tree.

In the example shown in FIG. 8A, there is no difference between the contents displayed on the preview screen display window 811 and the preview screen display window 851. Accordingly, there is no highlighted display for indicating a difference in the preview screen display window 811 and the preview screen display window 851.

In the same manner, there is no difference between each DOM element in the DOM tree in the window 821 for displaying the DOM tree, and each DOM element in the DOM tree in the window 861 for displaying the DOM tree. Accordingly, there is no highlighted display for indicating a difference in the window 821 for displaying the DOM tree and the window 861 for displaying the DOM tree.

The output screen 801 shown in FIG. 8B is the same as the output screen 801 shown in FIG. 8A. As shown in FIG. 8B, it is assumed that the user has clicked on the DOM element "<p class="oneuiSubTitle">Hello,admin.</p>" (frame portion) in the window 821 for displaying the DOM tree with a pointing device and selected the same. This frame is added to clearly indicate the selected portion, and the frame does not have to be displayed on the actual screen.

As shown in FIG. 8C, in response to the selection of the DOM element, the computer detects the difference between the CSSs applied to the selected DOM element and the DOM element "<p class="oneuiSubTitle">Hello,admin.</p>" (see 861) corresponding to the selected DOM element. The computer displays the CSS applied to the selected DOM element and the CSS applied to the DOM element corresponding to the selected DOM element in the window 831 for displaying the CSS and the window 871 for displaying the CSS, respectively. However, since no difference is detected between the CSSs, the computer does not display the CSS in the window 831 for displaying the CSS and the CSS in the window 871 for displaying the CSS in a highlighted manner.

FIG. 9 is a diagram showing an example of a functional block diagram of a computer for detecting, according to the embodiment of this disclosure, an influence that is caused by a change in the application from which a DOM tree and CSS may be extracted. This computer may have the hardware configuration of FIG. 1, for example.

According to the embodiment of this disclosure, a computer 901 is a computer for detecting an influence that is caused by changing the source code of the application, and is the computer shown in FIG. 1, for example.

The computer 901 includes saving means 911, acquisition means 912, comparison means 913, and output means 914.

The saving means 911 saves an input operation of a user on the application, and a DOM tree and CSS for each of one or more times when a screen state is desired to be checked in, for example, a storage medium 921 (corresponding to the storage medium 291 shown in FIG. 2) or a storage medium 922 (corresponding to the storage medium 292 shown in FIG. 2).

The saving means 911 may perform blocks 203 to 216 shown in FIG. 2.

After the source code is changed, the acquisition means 912 emulates the input operations in the operation order, acquires a DOM tree and CSS for the same time as each of the one or more times when a screen state is desired to be checked, and saves the same in a storage medium 923 (corresponding to the storage medium 392 shown in FIG. 3), for example.

The acquisition means 912 may perform blocks 303 to 314 shown in FIG. 3.

The comparison means 913 reads a DOM tree and CSS saved by the saving means 911 from the storage medium 921 or the storage medium 922, for example, and reads a DOM tree and CSS saved by the acquisition means 912 from the storage medium 923, for example. The comparison means 913 compares the DOM tree and the CSS read out from the storage medium 921 or the storage medium 922 and the DOM tree and the CSS read out from the storage medium 923 for each of the same timings. Particularly, the comparison means 913 may compare each DOM element in the DOM tree and each corresponding DOM element in the corresponding DOM tree. Further, particularly, each value of each CSS property in the CSS and each value of each corresponding CSS property in the corresponding CSS may be compared with one another.

The comparison means 913 may perform block 315 shown in FIG. 3, and blocks 402 to 410, and 412 shown in FIG. 4A.

The output means 914 outputs the comparison result of the comparison means 913.

The output means 914 may perform block 411 shown in FIG. 4B.

FIG. 10 is a diagram showing an example of a functional block diagram of a computer for detecting, according to the embodiment of this disclosure, an influence that is caused by a change in the application from which a DOM tree and CSS may be extracted. In some embodiments, the computer may have the hardware configuration of FIG. 1, for example.

Like the computer 901 shown in FIG. 9, a computer 1001 shown in FIG. 10 includes acquisition means 1012, comparison means 1013, and output means 1014. The acquisition means 1012, the comparison means 1013, and the output means 1014 provided to the computer 1001 correspond to the acquisition means 912, the comparison means 913, and the output means 914 provided to the computer 901, respectively. The computer 1001 shown in FIG. 10 is different from the computer 901 shown in FIG. 9 in that the saving means 911 is not provided thereto.

The computer 1001 is capable of accessing a storage medium 1021 (corresponding to the storage medium 291 shown in FIG. 2) and a storage medium 1022 (corresponding to the storage medium 292 shown in FIG. 2) for saving an input operation of a user on the application, and a DOM tree and CSS for each of one or more times when a screen state is desired to be checked.

After the source code is changed, the acquisition means 1012 accesses the storage medium 1022, emulates the input operations in the operation order, acquires a DOM tree and CSS for the same time as each of the one or more times when a screen state is desired to be checked, and saves the same in a storage medium 1023 (corresponding to the storage medium 392 shown in FIG. 3), for example.

The acquisition means 1012 may perform blocks 303 to 314 shown in FIG. 3.

The comparison means 1013 compares the DOM tree and the CSS saved in the storage medium 1021 or the storage medium 1022, for example, and the DOM tree and the CSS saved in the storage medium 1023, for example, for each of the same times.

The comparison means 1013 may perform block 315 shown in FIG. 3, and blocks 402 to 410, and 412 shown in FIG. 4A.

The output means 1014 outputs the comparison result of the comparison means 1013.

The output means 1014 may perform block 411 shown in FIG. 4B.

What is claimed is:

1. A computer-implemented method for detecting an influence caused by changing a source code of an application from which a document object model (DOM) tree and cascading style sheets (CSSs) are extracted, the method comprising:

saving one or more input operations of a user of the application, a DOM tree, and a CSS for each of one or more times that an instruction is received to check a screen state;

emulating, after the source code is changed, the one or more input operations in an operation order, for each of the one or more times;

acquiring a DOM tree and CSS for each of the one or more times;

comparing the saved DOM tree and CSS with the acquired DOM tree and CSS for each of the one or more times; and outputting a result of the comparison.

2. The method of claim 1, wherein the comparing comprises:

specifying, among CSS properties in at least one of the saved CSS and the acquired CSS, a first CSS property used for actual screen display at a specific time among the one or more times;

specifying, among the CSS properties in the acquired CSS, a second CSS property used for actual screen display at the same time as the specific time; and comparing the first CSS property and the second CSS property.

3. The method of claim 1, wherein
the saving comprises at least one of:

saving, for each DOM element in the saved DOM tree, a first CSS property to be applied to the DOM element and a definition location of the first CSS property, and acquiring, for each DOM element in the saved DOM tree, a value used as an initial value, if the first CSS property to be applied to the DOM element is undefined; and the emulating comprises at least one of:

acquiring, for each DOM element in the acquired DOM tree, a second CSS property to be applied to the DOM element and a definition location of the second CSS property, and acquiring, for each DOM element in the acquired DOM tree, a value that is used as an initial value, if the second CSS property to be applied to the DOM element is undefined.

4. The method of claim 3, wherein the outputting further comprises displaying the saved DOM tree, in which DOM elements that differ between the displayed DOM tree and the acquired DOM tree are highlighted.

5. The method of claim 4, wherein the outputting further comprises displaying, in response to a selection of a highlighted DOM element, a CSS property to be applied to the selected highlighted DOM element and a definition location of the CSS property.

6. The method of claim 1, wherein the outputting comprises outputting a portion that differs, at a single time, between two or more graphical user interfaces of the application.

7. A system for detecting an influence caused by changing a source code of an application from which a document object model (DOM) tree and cascading style sheets (CSSs) are extracted, the system comprising:

a memory; and one or more processors, communicatively coupled to the memory, the one or more processors configured to:

save one or more input operations of a user of the application, a DOM tree, and a CSS for each of one or more times that an instruction is received to check a screen state;

emulate, after the source code is changed, the one or more input operations in an operation order, for each of the one or more times;

acquire a DOM tree and CSS for each of the one or more times;

compare the saved DOM tree and CSS with the acquired DOM tree and CSS for each of the one or more times; and output a result of the comparison.

8. The system of claim 7, wherein the compare comprises:

specifying, among CSS properties in at least one of the saved CSS and the acquired CSS, a first CSS property used for actual screen display at a specific time among the one or more times;

specifying, among the CSS properties in the acquired CSS, a second CSS property used for actual screen display at the same time as the specific time; and comparing the first CSS property and the second CSS property.

9. The system of claim 7, wherein the save comprises at least one of:

saving, for each DOM element in the saved DOM tree, a first CSS property to be applied to the DOM element and a definition location of the first CSS property, and acquiring, for each DOM element in the saved DOM tree, a value used as an initial value, if the first CSS property to be applied to the DOM element is undefined; and the emulate comprises at least one of:

acquiring, for each DOM element in the acquired DOM tree, a second CSS property to be applied to the DOM element and a definition location of the second CSS property, and acquiring, for each DOM element in the acquired DOM tree, a value that is used as an initial value, if the second CSS property to be applied to the DOM element is undefined.

10. The system of claim 9, wherein the output comprises displaying the saved DOM tree, in which DOM elements that differ between the displayed DOM tree and the acquired DOM tree are highlighted.

11. The system of claim 10, wherein the output comprises displaying, in response to a selection of a highlighted DOM element, a CSS property to be applied to the selected highlighted DOM element and a definition location of the CSS property.

12. The system of claim 7, wherein the output comprises outputting a portion that differs, at a single time, between two or more graphical user interfaces of the application.

13. The system of claim 7, wherein:

the save comprises capturing a first screenshot of the application for each of the one or more times;

the emulate comprises capturing a second screenshot of the application at each of the one or more times; and the output comprises displaying each of the first screenshot captured in the save and the second screenshot acquired in the emulate, as the result of the comparison.

14. A computer program product for detecting an influence caused by changing a source code of an application from which a document object model (DOM) tree and cascading style sheets (CSSs) are extracted, the computer program product comprising a computer readable storage medium having program instructions embodied therewith, the program instructions executable by a processor to cause the processor to perform a method comprising:

saving one or more input operations of a user of the application, a DOM tree, and a CSS for each of one or more times that an instruction is received to check a screen state;

emulating, after the source code is changed, the one or more input operations in an operation order, for each of the one or more times;

acquiring a DOM tree and CSS for each of the one or more times;

comparing the saved DOM tree and CSS with the acquired DOM tree and CSS for each of the one or more times; and outputting a result of the comparison.

15. The computer program product of claim 14, wherein the comparing comprises:

specifying, among CSS properties in at least one of the saved CSS and the acquired CSS, a first CSS property used for actual screen display at a specific time among the one or more times;

specifying, among the CSS properties in the acquired CSS, a second CSS property used for actual screen display at the same time as the specific time; and comparing the first CSS property and the second CSS property.

16. The computer program product of claim 14, wherein the saving comprises at least one of:

saving, for each DOM element in the saved DOM tree, a first CSS property to be applied to the DOM element and a definition location of the first CSS property, and acquiring, for each DOM element in the saved DOM tree, a value used as an initial value, if the first CSS property to be applied to the DOM element is undefined; and the emulating comprises at least one of:

acquiring, for each DOM element in the acquired DOM tree, a second CSS property to be applied to the DOM element and a definition location of the second CSS property, and acquiring, for each DOM element in the acquired DOM tree, a value that is used as an initial value, if the second CSS property to be applied to the DOM element is undefined.

17. The computer program product of claim 16, wherein the outputting further comprises displaying the saved DOM tree, in which DOM elements that differ between the displayed DOM tree and the acquired DOM tree are highlighted.

18. The computer program product of claim 17, wherein the outputting further comprises displaying, in response to a selection of a highlighted DOM element, a CSS property to be applied to the selected highlighted DOM element and a definition location of the CSS property.

19. The computer program product of claim 14, wherein the outputting comprises outputting a portion that differs, at a single time, between two or more graphical user interfaces of the application.

20. The computer program product of claim 14, wherein:

the saving further comprises capturing a first screenshot of the application for each of the one or more times;

the emulating further comprises capturing a second screenshot of the application at each of the one or more times; and the outputting further comprises displaying each of the first screenshot captured in the saving and the second screenshot acquired in the emulating, as the result of the comparison.

* * * * *